United States Patent
Krupke et al.

(10) Patent No.: US 9,293,885 B2
(45) Date of Patent: Mar. 22, 2016

(54) ULTRAVIOLET TRIPLY-OPTICALLY-PUMPED ATOMIC LASERS (TOPAL)

(71) Applicants: William F Krupke, Pleasanton, CA (US); David Eimerl, Suisun City, CA (US)

(72) Inventors: William F Krupke, Pleasanton, CA (US); David Eimerl, Suisun City, CA (US)

( * ) Notice: Subject to any disclaimer, the term of this patent is extended or adjusted under 35 U.S.C. 154(b) by 0 days.

(21) Appl. No.: 14/770,778

(22) PCT Filed: Mar. 6, 2014

(86) PCT No.: PCT/US2014/021313
§ 371 (c)(1),
(2) Date: Aug. 26, 2015

(87) PCT Pub. No.: WO2014/138436
PCT Pub. Date: Sep. 12, 2014

(65) Prior Publication Data
US 2016/0013608 A1  Jan. 14, 2016

Related U.S. Application Data

(60) Provisional application No. 61/851,369, filed on Mar. 7, 2013.

(51) Int. Cl.
| H01S 3/30 | (2006.01) |
| H01S 3/094 | (2006.01) |
| H01S 3/227 | (2006.01) |

(52) U.S. Cl.
CPC ..... *H01S 3/094092* (2013.01); *H01S 3/094096* (2013.01); *H01S 3/227* (2013.01)

(58) Field of Classification Search
CPC .............. H01S 3/227; H01S 3/094096; H01S 3/094092; H01S 3/094
USPC ......................................................... 372/5, 1
See application file for complete search history.

(56) References Cited

U.S. PATENT DOCUMENTS 4,807,240 A * 2/1989 Goldstone ............... H01S 3/094
372/69

* cited by examiner

*Primary Examiner* — Tuan Nguyen
(74) *Attorney, Agent, or Firm* — John P. Wooldridge

(57) ABSTRACT

A continuous-wave (CW), ultraviolet triply-optically-pumped atomic laser (TOPAL) is disclosed. The inventive laser device includes a laser active media comprising a mixture of a neutral atomic vapor and one or more buffer gases. The gain mixture is placed within a segmented gain cell, allowing for periodic, selected spectral filtering of deleterious ASE transitions; the segmented gain cell, in turn, is placed within an optical cavity with a high Q at a specified ultraviolet wavelength, and is successively, resonantly excited by three drive pump lasers, in three energy-contiguous visible/IR electric-dipole allowed transitions, producing a steady-state electron population inversion density between a high-lying electronic energy level and the ground electronic level, and producing laser emission on a UV transition (within the spectral range ~230 to ~370 nm) terminating on the ground electronic level.

32 Claims, 25 Drawing Sheets

| 1st pump Transition | 1st pump l(nm) | 2nd pump Transition | 2nd pump l(nm) | 3rd pump Transition | 3rd pump l(nm) | Laser Transition | Laser l(nm) |
|---|---|---|---|---|---|---|---|
| Via S-levels | | | | | | | |
| $6^2S_{1/2} - 6^2P_{3/2}$ | 852.344 | $6^2P_{3/2} - 7^2S_{1/2}$ | 1359.2 | $7^2S_{1/2} - 9^2P_{3/2}$ | 1093.32 | $9^2P_{1/2} - 6^2S_{1/2}$ | 361.83 |
| | | | | $7^2S_{1/2} - 8^2P_{3/2}$ | 1378.119 | $8^2P_{1/2} - 6^2S_{1/2}$ | 388.967 |
| | | $6^2P_{3/2} - 8^2S_{1/2}$ | 761.097 | $8^2S_{1/2} - 9^2P_{3/2}$ | 2971.954 | $9^2P_{1/2} - 6^2S_{1/2}$ | 361.83 |
| | | | | $8^2S_{1/2} - 8^2P_{3/2}$ | 6781.454 | $8^2P_{1/2} - 6^2S_{1/2}$ | 388.967 |
| Via D levels | | | | | | | |
| $6^2S_{1/2} - 6^2P_{3/2}$ | 852.344 | $6^2P_{3/2} - 6^2D_{3/2}$ | 876.375 | $6^2D_{3/2} - 9^2P_{3/2}$ | 1963.45 | $9^2P_{1/2} - 6^2S_{1/2}$ | 361.83 |
| | | | | $6^2D_{3/2} - 8^2P_{3/2}$ | 3122.18 | $8^2P_{1/2} - 6^2S_{1/2}$ | 388.967 |

Figure 10: Cesium TOPAL energy level schemes

| 1st pump Transition | 1st pump l(nm) | 2nd pump Transition | 2nd pump l(nm) | 3rd pump Transition | 3rd pump l(nm) | Laser Transition | Laser l(nm) |
|---|---|---|---|---|---|---|---|
| Via S-levels | | | | | | | |
| $5^2S_{1/2} - 5^2P_{3/2}$ | 780.24 | $5^2P_{1/2} - 6^2S_{1/2}$ | 1323.69 | $6^2S_{1/2} - 8^2P_{3/2}$ | 1026.67 | $8^2P_{1/2} - 5^2S_{1/2}$ | 335.187 |
| | | | | $6^2S_{1/2} - 7^2P_{3/2}$ | 1202.567 | $7^2P_{1/2} - 5^2S_{1/2}$ | 359.259 |
| | | | | $6^2S_{1/2} - 6^2P_{3/2}$ | 2718.06 | $6^2P_{1/2} - 5^2S_{1/2}$ | 421.67 |
| | | $5^2P_{1/2} - 7^2S_{1/2}$ | 726.2 | $7^2S_{1/2} - 8^2P_{3/2}$ | 2839.0 | $8^2P_{1/2} - 5^2S_{1/2}$ | 335.187 |
| | | | | $7^2S_{1/2} - 7^2P_{3/2}$ | 6416.69 | $7^2P_{1/2} - 5^2S_{1/2}$ | 359.259 |
| Via D levels | | | | | | | |
| $5^2S_{1/2} - 5^2P_{3/2}$ | 852.344 | $5^2P_{1/2} - 4^2D_{3/2}$ | 876.375 | $4^2D_{3/2} - 8^2P_{3/2}$ | 980.58 | $8^2P_{1/2} - 5^2S_{1/2}$ | 335.187 |
| | | | | $4^2D_{3/2} - 7^2P_{3/2}$ | 1174.38 | $7^2P_{1/2} - 5^2S_{1/2}$ | 359.259 |

Figure 11: Rubidium TOPAL energy level schemes

| 1st pump Transition | 1st pump λ(nm) | 2nd pump Transition | 2nd pump λ(nm) | 3rd pump Transition | 3rd pump λ(nm) | Laser Transition | Laser λ(nm) |
|---|---|---|---|---|---|---|---|
| Via S-levels | | | | | | | |
| $4^2S_{1/2} - 4^2P_{3/2}$ | 766.7 | | | | | | |
| | | $4^2P_{1/2} - 5^2S_{1/2}$ | 1243.53 | $5^2S_{1/2} - 8^2P_{3/2}$ | 892.592 | $8^2P_{1/2} - 4^2S_{1/2}$ | 310.298 |
| | | | | $5^2S_{1/2} - 7^2P_{3/2}$ | 995.256 | $7^2P_{1/2} - 4^2S_{1/2}$ | 321.854 |
| | | | | $5^2S_{1/2} - 6^2P_{3/2}$ | 1252.991 | $6^2P_{1/2} - 4^2S_{1/2}$ | 344.836 |
| | | $4^2P_{1/2} - 6^2S_{1/2}$ | 2239.401 | $6^2S_{1/2} - 8^2P_{3/2}$ | 2092.282 | $8^2P_{1/2} - 4^2S_{1/2}$ | 310.298 |
| | | | | $6^2S_{1/2} - 7^2P_{3/2}$ | 2759.527 | $7^2P_{1/2} - 4^2S_{1/2}$ | 321.854 |
| | | | | $8^2S_{1/2} - 6^2P_{3/2}$ | 6422.401 | $6^2P_{1/2} - 4^2S_{1/2}$ | 344.836 |
| Via D levels | | | | | | | |
| $4^2S_{1/2} - 4^2P_{3/2}$ | 852.344 | | | | | | |
| | | $4^2P_{1/2} - 3^2D_{3/2}$ | 1169.375 | $3^2D_{5/2} - 8^2P_{3/2}$ | 934.955 | $8^2P_{1/2} - 4^2S_{1/2}$ | 310.298 |
| | | | | $3^2D_{3/2} - 7^2P_{3/2}$ | 1048.21 | $7^2P_{1/2} - 4^2S_{1/2}$ | 321.854 |
| | | $4^2P_{1/2} - 4^2D_{3/2}$ | 693.821 | $4^2D_{3/2} - 8^2P_{3/2}$ | 2069.06 | $8^2P_{1/2} - 4^2S_{1/2}$ | 310.298 |

Figure 12: Potassium TOPAL energy level schemes

| 1st pump Transition | 1st pump λ(nm) | 2nd pump Transition | 2nd pump λ(nm) | 3rd pump Transition | 3rd pump λ(nm) | Laser Transition | Laser λ(nm) |
|---|---|---|---|---|---|---|---|
| Via S-levels | | | | | | | |
| $3^2S_{1/2} - 3^2P_{3/2}$ | 589.15 | $3^2P_{1/2} - 4^2S_{1/2}$ | 1138.48 | $4^2S_{1/2} - 6^2P_{3/2}$ | 865.21 | $6^2P_{1/2} - 3^2S_{1/2}$ | 268.12 |
| | | | | $4^2S_{1/2} - 5^2P_{3/2}$ | 1074.60 | $5^2P_{1/2} - 3^2S_{1/2}$ | 285.30 |
| | | | | $4^2S_{1/2} - 4^2P_{3/2}$ | 2205.6 | $4^2P_{1/2} - 3^2S_{1/2}$ | 330.39 |
| | | $3^2P_{1/2} - 5^2S_{1/2}$ | 615.59 | $5^2S_{1/2} - 6^2P_{3/2}$ | 2440.48 | $6^2P_{1/2} - 3^2S_{1/2}$ | 268.12 |
| | | | | $5^2S_{1/2} - 5^2P_{3/2}$ | 5428.61 | $5^2P_{1/2} - 3^2S_{1/2}$ | 285.30 |
| Via D levels | | | | | | | |
| $3^2S_{1/2} - 3^2P_{3/2}$ | 589.15 | $3^2P_{1/2} - 3^2D_{3/2}$ | 876.375 | $3^2D_{3/2} - 6^2P_{3/2}$ | 1230.784 | $6^2P_{1/2} - 3^2S_{1/2}$ | 268.12 |
| | | | | $3^2D_{3/2} - 5^2P_{3/2}$ | 1703.586 | $5^2P_{1/2} - 3^2S_{1/2}$ | 285.30 |
| | | $3^2P_{1/2} - 4^2D_{3/2}$ | 568.421 | $4^2D_{3/2} - 6^2P_{3/2}$ | 4009.613 | $6^2P_{1/2} - 3^2S_{1/2}$ | 268.12 |

Figure 13: Sodium TOPAL energy level schemes

| 1st pump Transition | 1st pump λ(nm) | 2nd pump Transition | 2nd pump λ(nm) | 3rd pump Transition | 3rd pump λ(nm) | Laser Transition | Laser λ(nm) |
|---|---|---|---|---|---|---|---|
| Via S-levels | | | | | | | |
| $2^2S_{1/2} - 2^2P_{3/2}$ | 670.961 | $2^2P_{1/2} - 3^2S_{1/2}$ | 812.842 | $3^2S_{1/2} - 5^2P_{3/2}$ | 846.78 | $5^2P_{1/2} - 2^2S_{1/2}$ | 256.308 |
| | | | | $3^2S_{1/2} - 4^2P_{3/2}$ | 1079.514 | $4^2P_{1/2} - 2^2S_{1/2}$ | 274.201 |
| | | $2^2P_{1/2} - 4^2S_{1/2}$ | 761.097 | $3^2S_{1/2} - 3^2P_{3/2}$ | 2688.707 | $3^2P_{1/2} - 2^2S_{1/2}$ | 323.359 |
| | | | | $4^2S_{1/2} - 5^2P_{3/2}$ | 2497.814 | $5^2P_{1/2} - 2^2S_{1/2}$ | 256.308 |
| | | | | $4^2S_{1/2} - 4^2P_{3/2}$ | 6861.111 | $4^2P_{1/2} - 2^2S_{1/2}$ | 274.201 |
| Via D-levels | | | | | | | |
| $2^2S_{1/2} - 2^2P_{3/2}$ | 670.961 | $2^2P_{1/2} - 3^2D_{3/2}$ | 610.52 | $3^2D_{3/2} - 5^2P_{3/2}$ | 1293.246 | $5^2P_{1/2} - 2^2S_{1/2}$ | 256.308 |
| | | | | $3^2D_{3/2} - 4^2P_{3/2}$ | 1928.094 | $4^2P_{1/2} - 2^2S_{1/2}$ | 274.201 |

Figure 14: Lithium TOPAL energy level schemes

| Parameter | Value | Units |
|---|---|---|
| first drive pump wavelength, $\lambda_{pump1}$ | 589.15 | nm |
| second drive pump wavelength, $\lambda_{pump2}$ | 1138.48 | nm |
| third drive pump wavelength, $\lambda_{pump3}$ | 2205.08 | nm |
| total gain cell length | 8 | cm |
| Gain cell segment length | 2.7 | cm |
| buffer gas | He | |
| buffer gas pressure | 290 | torr |
| Temperature | 280 | C |
| Single pass cavity loss | 0.5 | % |
| 330 nm output coupler reflectivity | 97.0 | % |

Figure 17

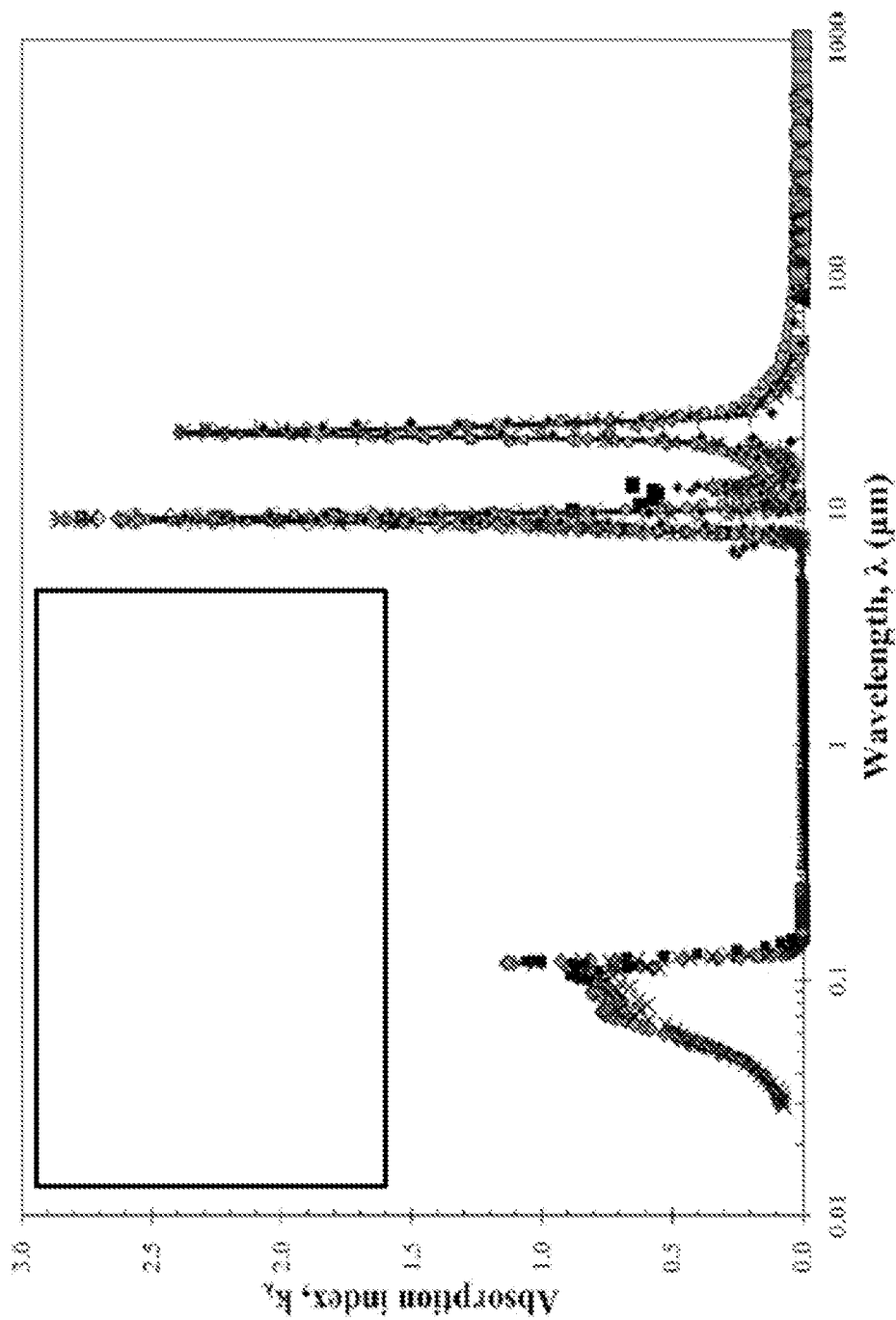

| 1st pump Transition | 1st pump λ(nm) | 2nd pump Transition | 2nd pump λ(nm) | 3rd pump Transition | 3rd pump λ(nm) | Laser Transition | Laser λ(nm) |
|---|---|---|---|---|---|---|---|
| Thallium | | | | | | | |
| $6\,^2P_{1/2}$-$7\,^2S_{1/2}$ | 377.68 | $7\,^2S_{1/2}$-$7\,^2P_{3/2}$ | 1151.60 | $7\,^2P_{3/2}$-$8\,^2S_{1/2}$ | 2180.45 | $8\,^2S_{1/2}$-$6\,^2P_{1/2}$ | 258.09 |
| | | | | $7\,^2P_{3/2}$-$9\,^2S_{1/2}$ | 1110.31 | $9\,^2S_{1/2}$-$6\,^2P_{1/2}$ | 231.66 |
| Indium | | | | | | | |
| $5\,^2P_{1/2}$-$6\,^2S_{1/2}$ | 410.291 | $6\,^2S_{1/2}$-$6\,^2P_{3/2}$ | 1291.61 | $6\,^2P_{3/2}$-$7\,^2S_{1/2}$ | 2229.61 | $7\,^2S_{1/2}$-$5\,^2P_{1/2}$ | 275.47 |
| | | | | $6\,^2P_{3/2}$-$8\,^2S_{1/2}$ | 1133.77 | $8\,^2S_{1/2}$-$5\,^2P_{1/2}$ | 246.08 |
| Gallium | | | | | | | |
| $4\,^2P_{1/2}$-$5\,^2S_{1/2}$ | 403.41 | $5\,^2S_{1/2}$-$5\,^2P_{3/2}$ | 1195.25 | $5\,^2P_{3/2}$-$6\,^2S_{1/2}$ | 2202.37 | $6\,^2S_{1/2}$-$4\,^2P_{1/2}$ | 266.066 |
| | | | | $5\,^2P_{3/2}$-$7\,^2S_{1/2}$ | 1097.167 | $7\,^2S_{1/2}$-$4\,^2P_{1/2}$ | 237.20 |

Figure 21

| Parameter | Value | Units |
|---|---|---|
| first drive pump wavelength, $\lambda_{pump1}$ | 377.68 | nm |
| second drive pump wavelength, $\lambda_{pump2}$ | 1151.60 | nm |
| third drive pump wavelength, $\lambda_{pump3}$ | 2180.45 | nm |
| gain cell length | 3.0 | cm |
| buffer gas | $CH_4$ | |
| buffer gas pressure | 0.2 | atm |
| Temperature | 550 | C |
| Single pass cavity loss | 1 | % |
| 258 nm output coupler reflectivity | 97.25 | % |

Figure 23

ULTRAVIOLET TRIPLY-OPTICALLY-PUMPED ATOMIC LASERS (TOPAL)

CROSS-REFERENCE TO RELATED APPLICATIONS

This application claims priority to International Application PCT/US2014/021313 titled "Ultraviolet Triply-Optically-Pumped Atomic Lasers (TOPAL)" filed in the U.S. Receiving Office on Mar. 6, 2014, which claims the benefit of U.S. Provisional Patent Application No. 61/851,369 titled "Ultraviolet Triply-Optically-Pumped Atomic Lasers (TOPAL)," filed Mar. 7, 2013, incorporated herein by reference.

BACKGROUND OF THE INVENTION

1. Field of the Invention

The present invention relates generally to continuous wave (CW) lasers and more specifically it relates to continuous wave lasers operating in the deep UV that do not require nonlinear optical crystal frequency convertors exposed to deep ultraviolet radiation with wavelengths less than ~370 nm.

2. Description of Related Art

An important application carried out with the aid of laser radiation is the detection and classification of small defects inadvertently produced in the fabrication of semiconductor chips. Generally, the smaller the defect, the shorter the laser wavelength must be. Historically, this laser application was accomplished using a continuous wave (CW) argon ion gas laser emitting its radiation at a wavelength of 514 nm or 488 nm as a primary source. To achieve adequately short deep ultraviolet wavelengths of radiation for commercially viable defect detection, the 514 nm or 488 nm output radiation from an argon ion gas laser is converted to second harmonic wavelengths of 257 nm or 244 nm, respectively, by interaction with a nonlinear optical (NLO) crystal. Wavelengths shorter than ~370 nm are designated herein as "deep ultraviolet wavelengths", or DUV. This type of deep UV source generally provides low output power (<1 watt), is extremely inefficient (<0.01%), requires extensive electrical power conditioning and active cooling, and is physically bulky. The utilized NLO crystal degrades during use and must be refurbished frequently (see more discussion below). The stressing physical operating conditions within an argon ion gas laser generally limit its operating lifetime to <10,000 hours. Thus, there is a need to develop CW deep ultraviolet laser sources that are more than an order of magnitude more powerful and efficient (i.e., multi-watt, >1%), whose reliabilities are not compromised by NLO crystal degradation due to exposure to DUV irradiation, are much more compact, and that require only comparably benign utilities.

In an attempt to overcome some of the limitations of this above described prior art, DUV lasers based on infrared-emitting, diode-pumped solid-state lasers (DPSSLs), combined with nonlinear harmonic generation, have been developed. These lasers possess performance features that are substantially superior to argon ion gas laser based solutions. Generally, this type of laser comprises a diode-pumped solid-state gain medium (such as Nd:YAG, Nd:YVO$_4$ or Yb fiber) emitting "fundamental" radiation in the near infrared spectral region (i.e., $\lambda_{IR}$ =1064 nm), and two or more harmonic non-linear optical (NLO) crystal converters. The NLO elements convert the fundamental IR radiation into radiation of shorter "harmonic" wavelengths: $\lambda_{IR}/2$, $\lambda_{IR}/3$, $\lambda_{IR}/4$, etc (i.e., 532 nm, 355 nm, 266 nm, respectively). Practically efficient harmonic conversion requires of the NLO crystal that: 1) its birefringence is such that the NLO conversion process is "phase-matched" (i.e., the indices of refraction at both fundamental and harmonic wavelengths are equal); 2) its nonlinearity is adequately large; 3) it is adequately transparent at all present wavelengths; and 4) its intensity threshold for optical damage substantially exceeds that of the drive intensity needed for efficient NLO conversion.

Long sustained searches for practical NLO crystals have resulted in the identification and commercial development of several NLO crystals capable of enabling practical use at output wavelengths >~370 nm, but only a few NLO crystals possessing properties suitable for harmonic generation at wavelengths lying in the deep ultraviolet spectral region <~370 nm. Among these latter crystals are lithium borate (LBO), beta-meta-borate (BBO), and cesium-lithium borate (CLBO).

Because the efficiency of such non-linear conversion processes scales rapidly with the intensity of the drive laser, and is degraded by poor beam quality, the drive lasers must irradiate a NLO crystal with a good spatial quality beam at intensities in the 100-1000 MW cm$^{-2}$ range for efficient harmonic conversion. These intensities are readily realized by pulsed solid state lasers but are a significant challenge for CW lasers. At such intensities, nonlinear optical materials tend to degrade during operation due to optical damage. This is particularly so for NLO crystals operating with output wavelengths below ~370 nm. Thus, 355 nm and 266 nm lasers based on the use of NLO crystals tend to degrade with operating time, so that their relatively short operating times before refurbishment or replacement becomes a cost driver for users. To be commercially viable, complicated and expensive defensive measures have been adopted, such as translating the nonlinear optical crystal transverse to the drive laser beam to operate in an undamaged region of the crystal.

For some inspection applications a purely continuous wave (i.e., not repetitively pulsed) optical laser source is required to avoid optical damage to the specimen being inspected. A prior art purely CW 266 nm source of laser radiation has been based on fourth harmonic generation of the 1064 nm fundamental radiation from a diode-pumped solid state laser [T. Suedmeyer, Optics Express, 16 (3) 1546 (2008)].

This type of laser consists of three major subsystems: 1) a CW, high-power 1064 nm Master-Oscillator-Power-Amplifier (MOPA) drive laser: 2) a second harmonic converter subsystem comprising, a first optical cavity containing a first non-linear crystal operating in the visible spectral region; and 3) a fourth harmonic converter subsystem comprising a second optical cavity and a second nonlinear crystal operating in the DUV spectral region. To respond to the need for high drive laser intensities at the nonlinear crystal to achieve practically high conversion efficiencies, it is necessary to resonate the drive radiation within each optical cavity containing a NLO crystal, to build up the drive intensity within the cavity. To stabilize the intra-cavity intensities, the length of each coupled optical cavity must be controlled to a fraction of its drive wavelength. The drive wavelength and the optical cavity length fluctuate due to thermal and to mechanical motion effects in the environment, so these effects must be monitored and actively counteracted using feedback mechanisms. While a single stage of frequency conversion can be achieved stably and efficiently, the stability requirements for a second stage are extremely challenging. While this type of CW DUV laser is more than an order of magnitude more efficient and powerful than the earlier prior art based on the argon-ion gas laser, the requirement of controlling the lengths of the coupled optical cavities to a fraction of the drive wavelengths greatly increases the complexity and cost, and greatly lowers operational availability of this type of source. As with the prior art based on the argon ion gas laser, the solid state based DUV CW 266 nm laser source is subject to degradation of the NLO crystals being exposed to short DUV 266 nm wavelength, high intra-cavity intensity radiation. Thus the need persists for a practical, powerful (multi-watt), efficient (>1%) reliable CW DUV source, not subject to the 266 nm-caused degradation of a NLO crystal of the prior art.

To avoid the most deleterious aspects of the above-mentioned intrinsic limitations of NLO based approaches to CW DUV laser sources, several prior art methods have been described wherein the energies of several longer wavelength laser photons are combined, by various means described below, thereby creating DUV wavelength laser photons.

In discussing, these various means, it is important to differentiate several distinct types of multiple photon processes. Herein we use the following terminology:

(A) Sequential photon energy "summing," or "summation" refers to the incoherent, time successive absorption of two or more photons from two or more drive pump lasers by a neutral atom, in which a valence electron is promoted from the ground electronic level successively to higher-lying real (non-virtual) electronic levels via on-resonance, parity-allowed, electric dipole transitions. The resulting electron population densities in the real electronic levels do not depend on any fixed relationships between the phases of electro-magnetic waves of the drive pump lasers.

(B) "Multi-photon-adding" refers to the coherent simultaneous absorption of two or more photons by a neutral atom, in which a valence electron is promoted from the ground electronic level to an excited electronic level of the same parity, via virtual, parity-allowed electric-dipole transitions. This multi-photon energy adding mechanism may occur in one of two types: 1) the involved virtual parity-allowed intermediate electronic levels lie in energy well away from any of the input photon energies; and 2) the input photon energies are detuned in energy from the resonance energy of a parity-allowed electric dipole transition between electronic levels of the atom being excited. The resulting electron population densities in real electronic levels depend on fixed phase relationships between the phases of electro-magnetic waves of the drive pump lasers.

In the related prior art shown in FIG. 1 Krupke [U.S. Pat. No. 6,693,942] disclosed a photon energy summing device in which the energies of two infrared wavelength photons are converted to the energy of a single visible wavelength photon in a gain mixture of alkali atoms and one or more buffer gases. The wavelength of radiation of one of the two drive pump lasers matches (is substantially equal to) the wavelength of either of the parity-allowed, electric-dipole $D_1$ or $D_2$ transitions of the alkali atoms. The wavelength of radiation of the second of the two drive pump lasers matches (is substantially equal to) the wavelength of one of a proscribed set of parity-allowed, electric dipole transitions whose initial electronic level energetically is the lowest $^2P_{1/2}$ or $^2P_{3/2}$ level of the alkali atom, and whose terminal level is the $_2D_{3/2}$ level that is somewhat higher than the energies of the second lowest lying $^2P_{3/2}$ and $^2P_{1/2}$ levels. Collisions with buffer gas atoms or molecules relax electrons from the pumped $^2D_{3/2}$ level to the second lowest $^2P_{3/2}$ and $^2P_{1/2}$ levels, generating a population inversion between the second lowest $^2P_{1/2}$ electronic level and the $^2S_{1/2}$ ground electronic level. This population inversion density enables laser emission generally in the visible spectral region. In practice this scheme suffers from two major deficiencies: 1) reliance on filling the upper laser level (the second lowest $^2P_{1/2}$ level) via collisions with buffer gases is generally inefficient, because excited electrons may be transferred as well to lower lying $^2S_{1/2}$, $^2P_{3/2}$ and $^2P_{1/2}$ levels; 2) population inversions are also created between the second lowest $^2P_{3/2}$ and $^2P_{1/2}$ levels and lower lying $^2S_{1/2}$, $^2D_{5/2}$ and $^2D_{3/2}$ levels. These population inversions give rise to amplified spontaneous emission (ASE) on the parity-allowed electric dipole transitions generally with wavelengths in the infrared spectral region. If allowed to grow uncontrollably by ASE, these infrared transitions will deplete the energy of electrons in the second lowest $^2P_{3/2}$ and $^2P_{1/2}$ levels intended for the visible wavelength output beam, and possibly may even prevent achievement of a population inversion with respect to the $^2S_{1/2}$ ground electronic level. To overcome these deficiencies of this prior art, some means must be conceived and implemented that better directs drive laser excitation preferentially into the upper laser electronic levels, and at means must be conceived and implemented to control and/or suppress deleterious ASE transitions. Additionally, based on two infrared drive photons, this prior art is limited to producing output photons whose wavelengths are generally in the visible spectral region, and not in the target DUV spectral region of the present application.

In related prior art shown in FIG. 2, Sulham and Perram (Applied Physics, B101, 57, 2010) have demonstrated the production of visible ASE emission upon irradiating neutral alkali atoms, or a mixture of an alkali atoms and one or more buffer gases, with two "drive" pump lasers neither of which is resonant, or matched, to electric dipole allowed transitions of the alkali atom. Rather, in this multi-photon-adding process, the two drive photons are simultaneously absorbed, exciting an electron from the $^2S_{1/2}$ ground electronic level to higher lying level of the same parity (i.e., $^2S_{1/2}$, $^2D_{3/2}$ or $^2D_{5/2}$ electronic level). In these so-called coherent two photon-pumped schemes, the output visible emission occurs on the parity-allowed electric dipole transition between the second lowest lying excited $^2P_{1/2}$ level and the $^2S_{1/2}$ ground electronic level.

In this laser scheme the Doppler peak cross-section of a purely 2-photon transition is proportional to the intensity of the drive laser. At the drive intensities of practical interest (~10's of kW/cm$^2$) this peak cross-section is generally orders of magnitude smaller than the typical peak Doppler cross-section of a parity-allowed electric dipole transition, ($10^{-18}$ cm$^2$ vs $10^{-11}$ cm$^2$, respectively). Thus to achieve practical degrees of drive photon absorption in such 2-photon pumped devices, the operating atom density generally needs to be higher, (requiring higher operating temperatures) and the gain cell lengths need to be longer, than for devices based on successive 1-photon absorption parity allowed electric dipole transitions. Again, employing two infrared drive photons only, output wavelengths are limited to the visible spectral region (i.e., 400-450 nm) in this related prior art.

Extending the coherent multi-photon excitation process to more than 2 photons was disclosed in the prior art (FIG. 3), by Goldstone (U.S. Pat. No. 4,807,240), He proposed the conversion of the energies of several infrared photons to produce a single photon whose energy is greater than the energies of any of the input photons, via a coherent, non-resonant multi-photon-adding mechanism in alkali atoms, illustrated in FIG. 3. However, since its appearance in 1989, Goldstone's teaching has not led to any commercial realizations of such devices. Again using the simultaneous non-resonant absorption of multiple drive photons, effective absorption transitions cross-sections scale with drive photon beam intensities, and generally will be much smaller than the peak resonant cross-sections. Accordingly, the demand intensities in the Goldstone teachings are generally an order of magnitude higher than those of present invention. Moreover, monitoring and control of pump wavelength and their de-tuning off-sets from transition resonances is complex and costly, compared to on-resonance operation.

SUMMARY OF THE INVENTION

The present invention provides a practical means for the efficient production of continuous wave deep ultraviolet radiation at a number of specific wavelengths in the ~230 to ~370 nm spectral region without utilizing NLO crystals subject to irradiation at wavelengths shorter than ~370 nm, a wavelength below which NLO crystal converters tend to lose their practical effectiveness. The present invention teaches how certain atomic vapors of the periodic table of the elements can be utilized to efficiently and incoherently "sum" the output powers of three "drive" pump lasers whose output wavelengths are resonant with or matched to (are substantially equal to) the wavelengths of certain parity-allowed electric dipole transitions of the atomic vapor atoms, when the atomic vapor is mixed with an appropriate buffer gas (or gases) forming a gain mixture and placed within a laser resonator cavity that has sufficiently high reflectivity (or Q-factors) at an appropriate specified ultraviolet wavelength. This type of laser device is referred to herein as a continuous-wave (CW), ultraviolet triply-optically-pumped atomic laser (TOPAL). A drive pump wavelength is said herein to be "resonant with", "matched to", or "substantially equal to" the wavelength of a transition when the pump wavelength is within about the spectral half-width of the transition. Due to the large pump transition dipole strengths of the selected atomic transition dipoles involved in the TOPAL incoherent photon energy summing process, the typical operating pump drive intensities are orders of magnitude lower than those found in conventional lasers using NLO crystal converters (i.e., 10's of kW cm$^{-2}$ vs. 100-1000 MW cm$^{-2}$), and generally significantly lower than those predicted for the prior art. coherent multi-photon enemy adding schemes. At the same time, in a TOPAL there is no requirement for "phase-matching" the drive pumps and output laser beams, since the energy-summing process itself is incoherent, and describable in terms of simple electron population density rate equations (as opposed to the density-matrix formulation necessary for the Goldstone prior art). Analysis also shows that, because of the relatively large cross-sections and relatively low corresponding saturation intensities of the selected transitions employed, TOPALs can efficiently generate ultraviolet laser power with a purely continuous-wave temporal waveform. Therefore, the life-limiting optical degradation and damage processes present in conventional NW wavelength converters at wavelengths shorter than ~370 nm are absent in this type of radiation converter, providing for long-lived power conversion in the UV spectral region ~230-~370 nm. Critical to the efficient functioning of a DUV TOPAL is rendering its gain cell in appropriate multiple segments that provide control and restraint of potentially deleterious amplified-spontaneous-emission (ASE) transitions that would deplete energy that otherwise would be available to the DIN output laser beam, or even prevent the desired population inversion with respect to the ground electronic level.

The present inventive new class of TOPALs differs essentially from the prior art described above by utilizing three specific "drive" pump lasers whose wavelengths are resonant with specific strong parity-allowed electric-dipole transitions of a neutral atomic atom, and used to irradiate a laser gain mixture of neutral atomic atoms and one or more buffer gases. TOPALs further differ essentially from the prior art by the approximate summing of the photon energies of the three "drive" pump lasers, producing a population inversion density between the ground $^2S_{1/2}$ level and a highly lying level connected by a parity-allowed electric dipole transition lying in the ultraviolet (~370-~230 nm) spectral region. TOPALs differ from the Goldstone prior art at least in that (a) the lasers are all fully resonant with atomic transitions, and not detuned, (b) a buffer gas is used to cause non-radiative atomic transitions between certain electronic level pair(s) in addition to those levels directly driven by the drive lasers, (c) no relatively consistent phase relation must be maintained between the drive lasers and (d) efficient operation is achieved at the 10's of kW/cm$^2$ scale drive laser intensities. Further, TOPAL gain cells and associated optical elements are designed in a manner that provides for control and restraint of any potentially deleterious ASE transitions, facilitating efficient operation of the TOPAL at a DUV-wavelength output.

In view of the foregoing disadvantages inherent in the known types of deep ultraviolet lasers, and particularly continuous wave (CW) deep ultraviolet lasers present in the prior art, the present invention provides a practical means to realize a family of CW, deep ultraviolet atomic vapor lasers that are incoherently, triply-optically-pumped, and rendered efficient by controlling and/or suppressing deleterious competing generally-infrared wavelength ASE transitions.

Many atoms of the periodic table may be considered for use as the laser active spicie in a TOPAL. From a practical standpoint, however, attention is naturally directed to those atoms possessing relatively high vapor pressures, in particular: 1) the neutral alkali atoms (Li, Na, K, Rb, Cs) that possess a single valence electron and a $^2S_{1/2}$ ground electronic configuration; and 2) the elements Thallium (Tl), Indium (In) and Gallium (Ga) that possess a single valence electron and $^2P_{1/2}$ ground electronic configuration. Below, we discuss in turn TOPALs based on these two types of atoms.

A TOPAL of the present invention generally comprises a gaseous laser gain medium formed by a mixture of neutral atomic vapor and one or more buffer gases. The buffer gases comprise the rare gases (He, Ar, Kr, Ne, and Xe) and/or small molecules, such as the hydrocarbon molecules ethane or methane, or small molecules such as $NH_3$, $NF_3$ or $CF_4$. The gain medium mixture is placed within a segmented gain cell which in turn is placed within an optical cavity whose cavity mirrors provide a high quality factor, Q, at the desired DUV output wavelength.

First consider TOPALs based on the use of alkali atoms. The desired DUV output radiation occurs on a transition that terminates on the $^2S_{1/2}$ ground electronic level of the alkali atom, and originates on a specified high lying (third or greater) $^2P_{1/2}$ electronic level of the alkali atom. Radiation from three "drive" laser pump sources, with three specific selected visible and/or IR wavelengths that are resonant with three specific parity-allowed transitions of the alkali atoms in the gain mixture, is directed into the laser cavity containing the alkali atomic vapor and buffer gas(es) laser gain mixture, and is absorbed by the alkali atoms. This excitation process induces a population inversion between a high lying (third or greater) $^2P_{1/2}$ electronic level and the $^2S_{1/2}$ ground electronic level, causing continuous wave laser action to occur at an ultraviolet wavelength of the so-pumped alkali atoms. The gain cell may be axially segmented into multiple sub-cells that are adjoined with suitable optical filtering elements that control and restrain the local intensities of potentially deleterious ASE radiation within the optical cavity.

Second consider TOPALs based on the use of the atoms of thallium, indium, or gallium. The desired DUV output radiation occurs on a transition that terminates on the $^2P_{1/2}$ ground electronic level of the selected atom, and originates on a specified high lying (third or greater) $^2S_{1/2}$ electronic level of the atom. Radiation from three "drive" laser pump sources, with three specific selected visible and/or IR wavelengths that are resonant with wavelengths of three specific parity-allowed transitions of the atoms in the gain mixture, is directed into the laser cavity containing the atomic vapor and buffer gas(es) laser gain mixture, and is absorbed by the atoms. This excitation process induces a population inversion between a high lying (second or greater) $^2S_{1/2}$ electronic level and the $^2P_{1/2}$ ground electronic level, causing continuous wave laser action to occur at an ultraviolet wavelength of the so-pumped atom. The gain cell may be axially segmented into multiple sub-cells that are adjoined with suitable optical filtering elements that control and restrain the local intensities of potentially deleterious ASE radiation within the optical cavity.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The present invention include a triply optically pumped atomic laser (TOPAL) device emitting continuously at a deep ultraviolet wavelength, overcoming the shortcomings of the prior art devices.

The present invention also includes efficient sources of ultraviolet radiation at numerous discrete wavelengths in the spectral range from ~230 nm to ~370 nm.

Other advantages of the present invention will become obvious to the reader and it is intended that these objects and advantages are within the scope of the present invention. To achieve the benefits of the invention, the invention may be embodied in the form illustrated in the accompanying drawings, attention being called to the fact, however, that the drawings are illustrative only, and that changes may be made in the specific construction illustrated.

The precise technical meanings of the words ASE and laser, as utilized in this provisional application, are crucial to the understanding of the inventive differences between the present invention and prior art.

To elucidate the precise technical meanings of these key words it is instructive to refer to FIGS. 4A and 4B. These figures show a cylindrically-shaped volume. Consider that the volume contains a gaseous-vapor medium whose atoms 1) possess a population inversion density between two energy levels, an upper level and a lower; and 2) provide optical gain at a wavelength, λ, corresponding to an electric dipole transition between these two levels.

FIG. 4A shows an electromagnetic wave (shown as a ray 10), freely propagating through the gain medium (not shown) in cell 12 in an arbitrary direction, whose wavelength matches the wavelength of the gain transition. Such a ray would be created when an atom in the gain medium spontaneously emits a photon from an excited upper level of the gain medium, and relaxes to the lower level. As the emitted ray propagates through the gain medium, it is amplified in intensity through the process of stimulated emission. Such amplified spontaneous emission, (ASE), experiences exponential growth in intensity with propagation distance in the gain medium, until the intensity becomes sufficiently large that intensity growth transitions towards linear with propagation distance in the gain medium.

If the ray 14 is trapped within a laser resonator, as shown with mirrors 16 and 18, which contains cell 12, as shown in FIG. 4B, the photons of the ray pass back and forth through the gain medium, gaining in intensity on each pass. If the round trip increase in ray intensity exceeds optical losses at the transition wavelength, including any absorption or transmission losses of the laser resonator mirrors, then laser oscillation is said to occur, as distinct from ASE.

BRIEF DESCRIPTION OF THE DRAWINGS AND TABLES

The accompanying Figures, which are incorporated into and form a part of the disclosure, illustrate embodiments of the invention and, together with the description, serve to explain the principles of the invention.

FIG. 1 shows a prior art energy level scheme of a CW visible alkali vapor laser pumped successively and incoherently by two photons (Krupke, U.S. Pat. No. 6,693,942).

FIG. 2 shows a prior art energy level scheme of a atomic rubidium visible laser pump simultaneously and coherently by two photons (Sulham and Perram, Applied Physics, B101, 57 (2010)).

FIG. 3 shows a prior art energy level scheme of an alkali UV laser, coherently, non-resonantly pumped by multiple photons (Goldstone, U.S. Pat. No. 4,807,240).

FIG. 10 shows Cesium TOPAL energy level schemes.

FIG. 11 shows Rubidium TOPAL energy level schemes.

FIG. 12 shows Potassium TOPAL energy level schemes.

FIG. 13 shows Sodium TOPAL energy level schemes.

FIG. 14 shows Lithium TOPAL energy level schemes.

FIG. 17 shows 330 nm Sodium TOPAL, device parameter assumptions.

FIG. 20 shows the absorption index, k, of the complex index of refraction, n + ki, of silica glass.

FIG. 21 shows Thallium, Indium, and Gallium TOPAL energy level schemes.

FIG. 23 shows 258 nm Thallium TOPAL device parameter assumptions.

DETAILED DESCRIPTION OF THE INVENTION

First consider TOPALs employing neutral alkali atoms. Each neutral alkali atom possesses a single valance electron. Each electronic energy level available to this valance electron is distinguished by values of the four "good" quantum numbers: n, $\underline{S}$, L and $J=L\pm \underline{S}$ (principle spin, orbital, and total angular momentum, respectively), and is labeled by $n^{(2\underline{S}+1)}L_{(2J+1)}$. Further, since for a single valance electron all levels have $\underline{S}=1/2$ alkali atom electronic levels are labeled by $n\, ^2L_{(2J+1)}$. The quantum number L can take values of 0, 1, 2 etc. When L=0, J=1/2, and such electronic levels are labeled $n\, ^2S_{1/2}$. When L=1, J=1/2, or 3/2, and such levels are labeled $n\, ^2P_{1/2}$ or $n\, ^2P_{3/2}$. When L=2, J=J=3/2, or 5/2, and such levels are labeled a $n\, ^2D_{3/2}$ or $n\, ^2D_{5/2}$. As the mass of the alkali atom increases monotonically in its column of the Periodic Table, the electron shells are progressively filled and the value of n assumes a minimum value: Li, n≥2; Na, n≥3; K, n≥4; Rb, n≥5; Cs, n≥6, (Note this rule is suspended for D levels in Cs and Rb). Transitions between electronic levels for which $\Delta L=\pm 1$, and $\Delta J=0, \pm 1$ are parity-allowed electric dipole transitions and are relatively strong, resulting in relatively large transition cross-sections compared to transitions for which these selection rules do not obtain. In TOPALs, all selected transitions are parity-allowed electric dipole allowed.

For all alkali atom based TOPALs the first drive pump laser wavelength is set to match the wavelength of the so-called $D_2$ transition between the $^2S_{1/2}$ ground electronic level and the energetically lowest lying $^2P_{3/2}$ level. For all alkali atom based TOPALs the second drive pump laser wavelength is set to match the wavelength of allowed electric dipole transition originating the energetically lowest lying $^2P_{1/2}$ level. In a TOPAL this level is populated with electrons transferred non-radiatively from the pumped $^2P_{3/2}$ level as a result of collisions with buffer gas(es). Ideally, this non-radiative relaxation process is sufficient fast so that the electron population densities in this excited pair of $^2P$ levels attains a Boltzmann distribution at the gas mixture temperature. However, regarding the second and third drive pump lasers, there are two generic types of alkali atom TOPAL energy level schemes, as discussed in detail below.

Figure 1:
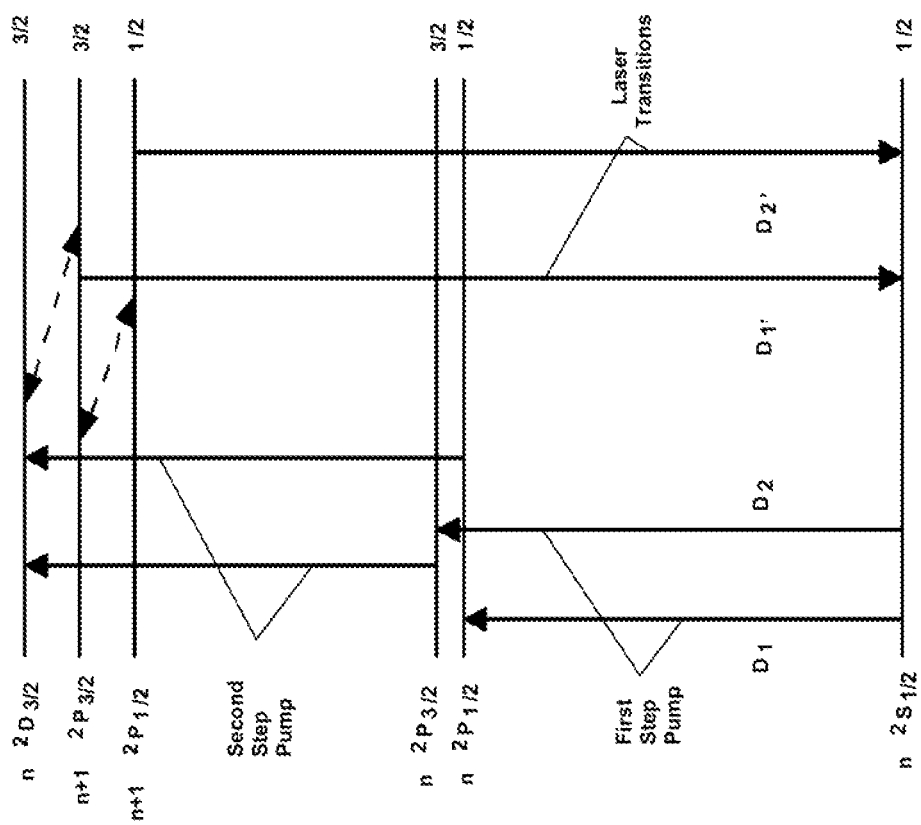
Figure 2:
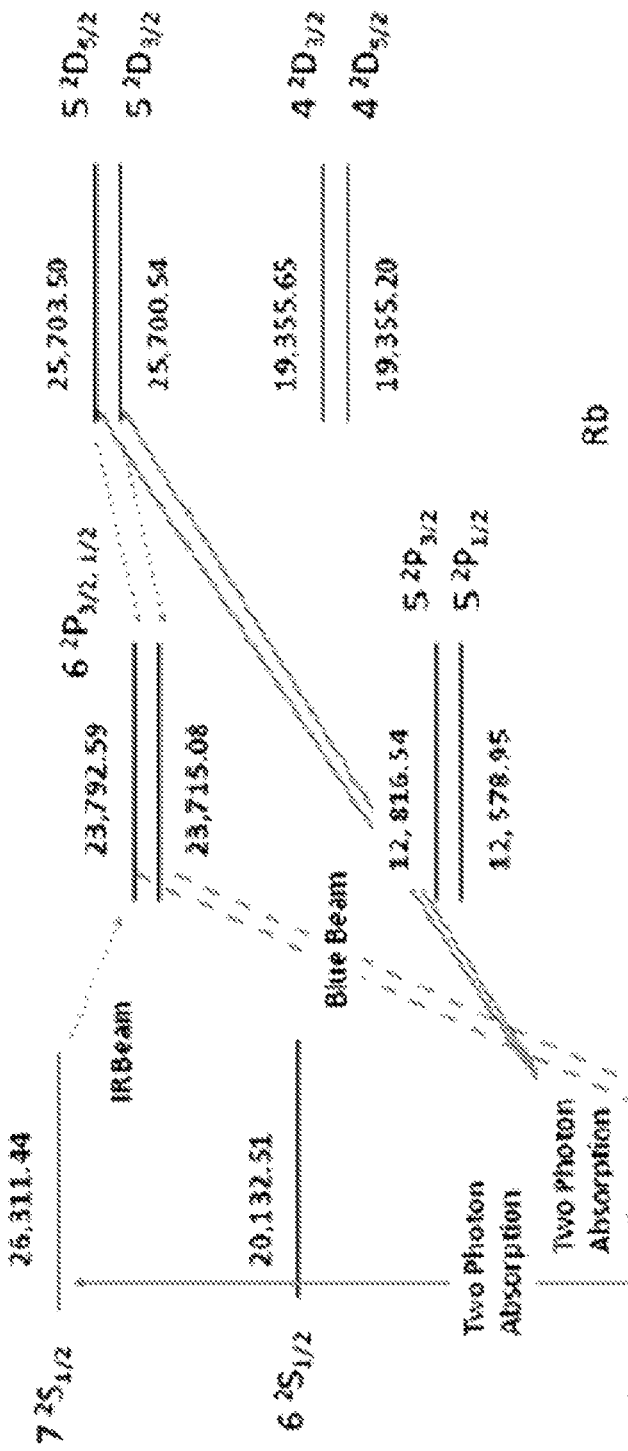
Figure 3:
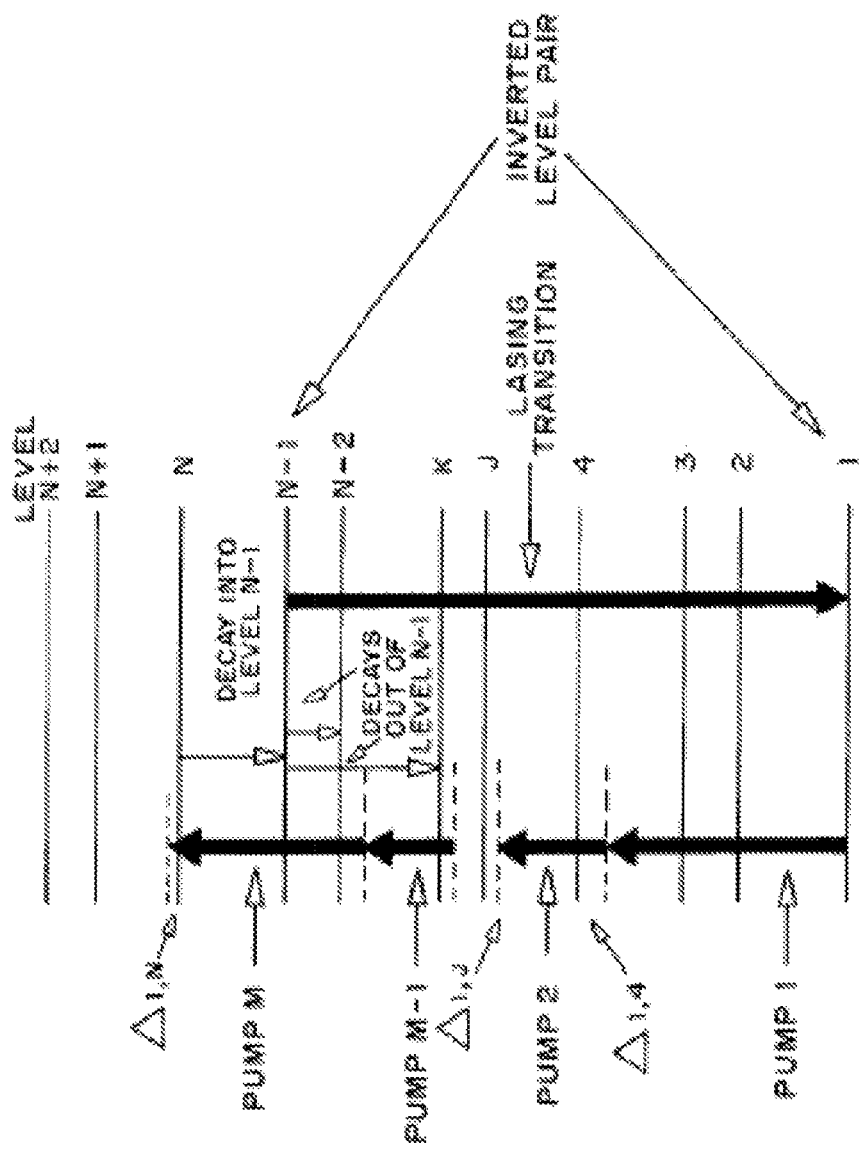
Figure 4:
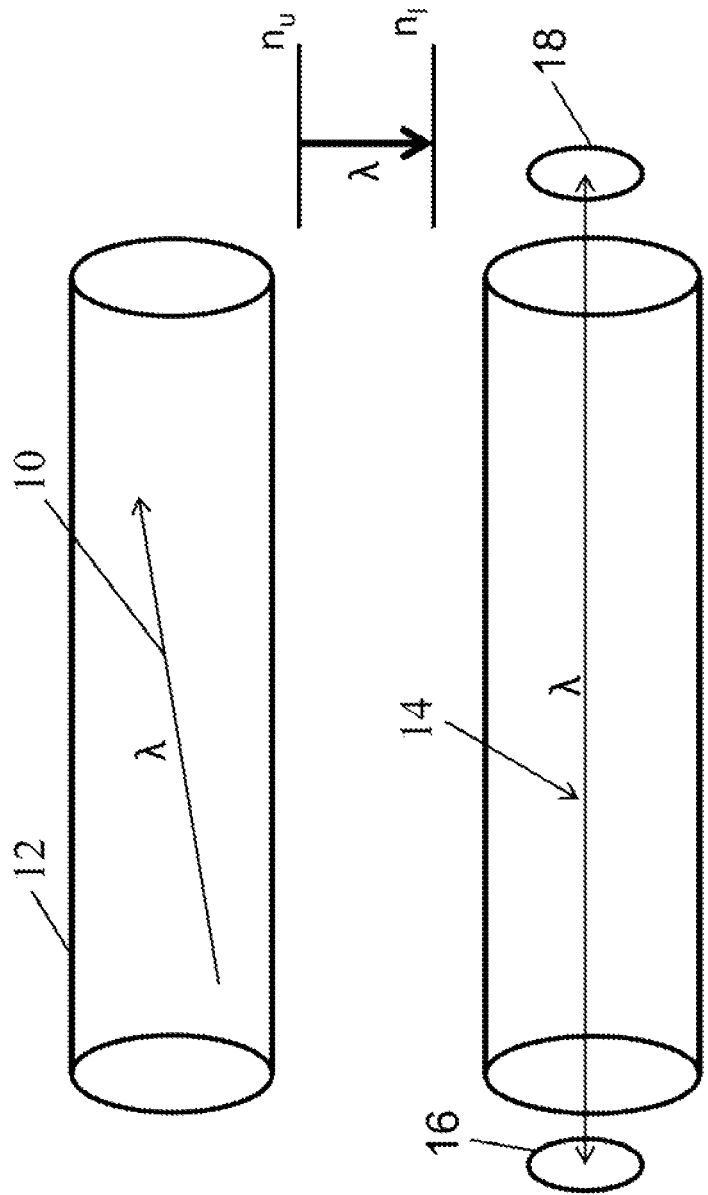
FIG. 4 shows cylindrical cells containing gain media providing optical gain at wavelength λ.
Figure 5:
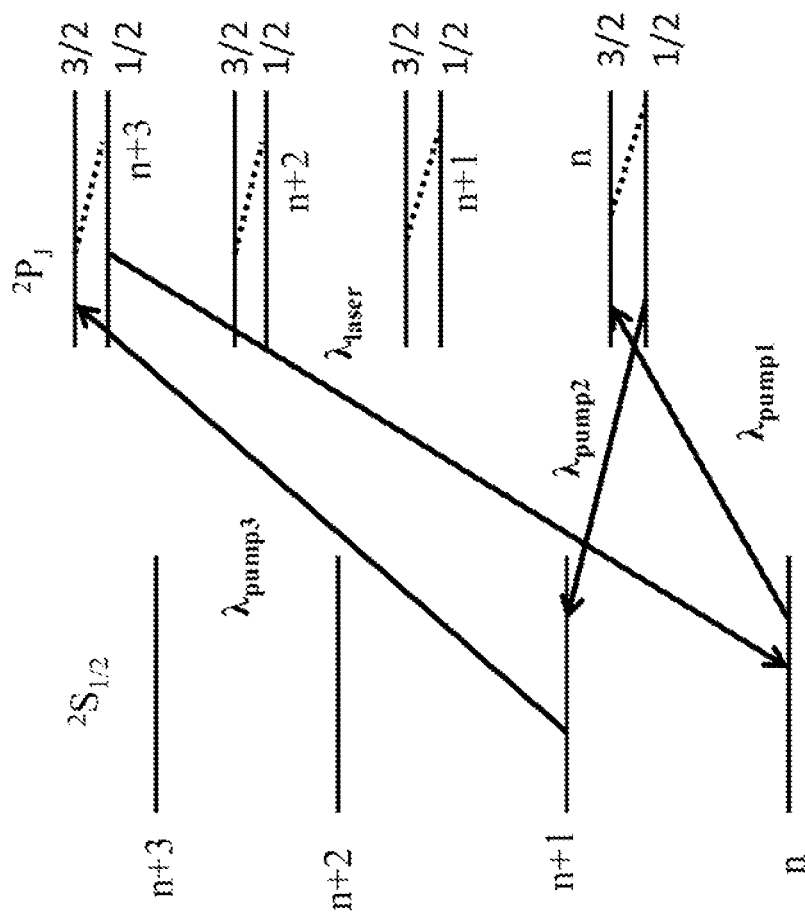
FIG. 5 shows the energy level scheme of an alkali TOPAL pumped via $^2S_{1/2}$ levels.

FIG. 5 shows one of these TOPAL types in which the terminal level of the second drive pump laser is a $^2S_{1/2}$ level (hereafter designated as "pumping via $^2S_{1/2}$ levels"). In FIG. 5, solid arrows denote optical pump and output laser transitions. Dotted lines denote radiation-less transitions between electronic levels, mediated by alkali atom collisions with a buffer gas or buffer gases. $^2D_J$ electronic levels are not shown in FIG. 5.

Figure 6:
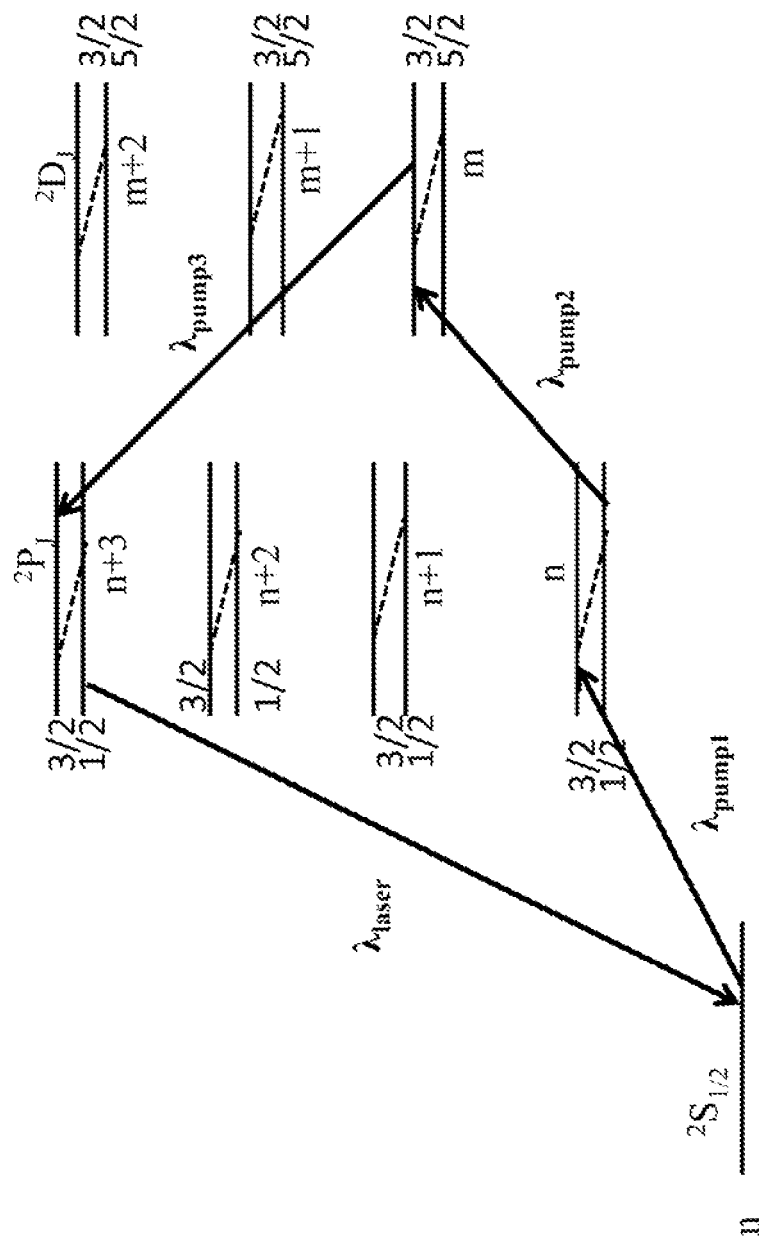
FIG. 6 shows the energy level scheme of an alkali TOPAL pumped via $^2D$ levels.

FIG. 6 shows the other alkali atom TOPAL type in which the terminal level of the second drive pump laser is a $^2D_{3/2}$ level (hereafter designated as "pumping via $^2D_{3/2}$ levels"). In FIG. 6, solid arrows denote optical pump and output laser transitions. Dotted lines denote radiation-less transitions between electronic levels, mediated by alkali atom collisions with a buffer or buffer gases. Excited $^2S_{1/2}$ electronic levels are not shown in FIG. 6. For Cesium and Rubidium, and Potassium, m=n−1; for Sodium, m=n; and for Lithium, m=n+1. As shown, the $^2D_{3/2}$ levels lie somewhat higher in energy than the paired $^2D_{5/2}$ levels. This is the energy ordering for Potassium and Sodium alkali atoms. For Cesium, Rubidium, and Lithium, the reverse is the case: the $^2D_{5/2}$ levels lie somewhat higher in energy than the paired $^2D_{3/2}$ levels.

The basic TOPAL device configuration, and preferred embodiment (FIG. 7), is as follows: the beams from three separate external drive pump laser sources 70, 72 and 74 are arranged to be co-linear, e.g. with beam splitters 76, 82 and mirrors 78, 80, and optically passed axially through a circularly-symmetric cell 84 (which may be a segmented cell), each gain cell or sub-cell containing a gain mixture of metal vapor, as discussed herein (e.g., alkali, Thallium, Indium, Gallium) and one or more buffer gases (e.g., chosen from among all isotopes of the rare gases: He, Ne, Ar, Kr, Xe, and small molecules, such as the hydrocarbon molecules ethane and methane, or the small molecule ammonia, fluorinated ammonia, and fluorinated methane). The gain cell containing the gain mixture is placed within an optical cavity formed by end mirrors 86 and 88 with the following characteristics: 1) end mirror 86 is very highly reflecting at the UV wavelength of the selected TOPAL laser transition; the other end mirror 88, is partially transmitting at this wavelength, thus serving as the output coupler for the UV laser transition. The quality factor, Q, of this optical cavity formed between end mirrors 86 and 88 is made sufficiently high to allow for practically useful conversion of drive pump laser power into UV laser output power; 2) end mirror 86 has substantially high transmission at the wavelengths of the three external drive pump laser wavelengths, allowing for efficient injection of the radiation of these pump lasers into the gain cell where this radiation is absorbed in the gain mixture. End mirror 88 may also have substantially high reflectivity at these three drive pump wavelengths, enabling radiation of the drive pump lasers not absorbed on a first pass through the gain cell to make a second pass through the cell. Fluorescence at various selected wavelengths emitted from the side of the gain cell is monitored to provide feedback signals to the three drive pump lasers to maintain the wavelengths of the three drive pumps resonant with their respective atomic transitions. The gain cell 84 is operatively placed, in an oven 85 to heat the vapor to a desired temperature as discussed below. Notice the feedback element 89 set provide feedback signals to set/maintain the drive pump wavelengths.

There are variations of this preferred embodiment, such as axially pumping the gain cell from both ends enabled by the use of resonator end mirrors coated with appropriate dichroic thin films, well know in the state of the art. There are other configurations of pump lasers besides axial pumping, notably transverse pumping. Typically transverse pumping enables greater CW output power. Managing waste heat produced in the gain cell by flowing the gain medium can increase the CW laser output power without limit, except for the laser power of the pumps and the damage thresholds of the optics.

Consider in more detail TOPALs pumped via $^2S_{1/2}$ levels as illustrated in FIG. 5. The first excitation step is produced by the first drive pump, with a power $P_1$, having a wavelength $\lambda_{pump1}$. This first excitation step always takes place in the $n\, ^2S_{1/2} \rightarrow n\, ^2P_{3/2}$ transition (so-called $D_2$ transition). The quantum number of this transition satisfies the selection rules for a parity-allowed, electric dipole transition: $\Delta L=\pm 1, \Delta J=0, \pm 1$, assuring a strong transition cross-section, The second excitation is produced by the second drive pump, with a power $P_2$, having a wavelength $\lambda_{pump2}$. This second step excitation always originates on the $n\, ^2P_{1/2}$ level and terminates on a $^2S_{1/2}$ level whose principle quantum number is n+1, or n+2, etc., that is, the second pump transitions are a $^2P_{1/2} \rightarrow (n+1)\ ^2S_{1/2}$, or n $^2P_{1/2} \rightarrow (n+2)\ ^2S_{1/2}$, etc. These transitions also satisfy the selection rules: $\Delta L = \pm 1$, $\Delta J = 0, \pm 1$, and are also parity allowed electric-dipole transitions.

The third excitation step is produced by the third drive pump, with a power $P_3$, having a wavelength $\lambda_{pump3}$. This third excitation step originates on the terminal level of the second step excitation and terminates on a $^2P_{3/2}$ level lying higher in energy than the terminal level of the second step excitation: that is, if the terminal level of the second step excitation has a principle quantum number $(n+1)$, then the principle quantum number of terminal level of the third step excitation is, generally, $\geq (n+1)$. The third step transition also satisfies the selection rules: $\Delta L = \pm 1$, $\Delta J = 0, \pm 1$, and is a parity-allowed electric dipole transition.

In a TOPAL, the $^2P_{3/2}$ electron populations driven by the first and third drive pump lasers are necessarily relaxed by collisions with buffer gas atoms or molecules to their respective, paired lower-lying $^2P_{1/2}$ levels. Let the respective energy splitting of these pairs be $\Delta E_1$ and $\Delta E_3$. If these collisional relaxation rates are sufficiently fast (generally proportional to the buffer gas number density), and the three drive pump laser intensities are sufficiently high (see below), then the electron population of the $^2P_{1/2}$ level paired with the terminal level of the third excitation step is inverted with respect to the electron population in the n $^2S_{1/2}$ ground level. Laser action on the corresponding UV transition terminating on the ground level, with a wavelength $\lambda_{laser}$, is enabled when the optical cavity losses at this UV wavelength are rendered sufficient small.

In addition to the aforementioned population inversion established to permit DUV laser emission, population inversions will also be created between $^2P_{3/2}$ and $^2P_{1/2}$ levels excited by the third drive pump laser and lower-lying electronic levels of opposite parity that are not directly excited by first and second pumps, and therefore nominally unpopulated. For efficient DUV laser extraction of atom excitation energy, it is necessary to substantially limit the degree of amplified spontaneous emission (ASE) on these parity-allowed electric dipole transitions. Generally, it is the longest wavelength of these ASE transitions that are most deleterious to efficient DUV laser emission because the magnitude of the emission cross-section scales as the square of the transition wavelength. ASE on such transitions will have no significant deleterious effect on the efficiency of DUV energy extraction if the degree of ASE growth is limited to approximately $\leq 10$ nepers. This need to limit ASE growth is addressed in the present invention by segmenting the gain cell, as shown schematically in FIG. 8 and in more detail in FIG. 9, and inserting periodically along the axis of the optical resonator optical elements that absorb preferentially at the wavelength(s) of the threatening ASE transition(s), while having low loss at the wavelengths of the first, second, and third drive pump wavelengths, and at the wavelength of the DUV laser output wavelength.

Next, consider in more detail the type of alkali TOPAL that is pumped via a second excitation step that terminates on a $^2D_{3/2}$ level (see FIG. 6). Again, the first excitation step is produced by a first drive pump laser, with power $P_1$, with as wavelength $\lambda_{pump1}$. Again, his first excitation step always takes place in the $^2S_{1/2} \rightarrow n\ ^2P_{3/2}$ transition (so-called $D_2$ transition), as in the first TOPAL type described earlier. As noted above, the quantum numbers of this first step transition satisfies the selection rules: $\Delta L = \pm 1$, $\Delta J = 0, \pm 1$, and is a parity-allowed electric-dipole transition.

In this second alkali TOPAL type, however, the second excitation step originates on the n $^2P_{1/2}$ level but terminates on one of the m $^2D_{3/2}$ levels lying higher in energy, where m=n−1 for Cesium, Rubidium, and Potassium; m=n for Sodium; and m=n+1 for Lithium. The quantum numbers of this second step transition satisfy the selection rules: $\Delta L = \pm 1$, $\Delta J = (\ ), \pm 1$, and is a parity-allowed electric dipole transition.

In this second alkali TOPAL type, the third excitation step originates on either the m $^2D_{3/2}$ or the m $^2D_{5/2}$ level (whichever lies lower in energy) of the second step transition, and terminates on a higher lying $^2P_{3/2}$ level. The third step transition also satisfies the selection rules: $\Delta L = \pm 1$, $\Delta J = (\ ), \pm 1$, and is as parity-allowed electric dipole transition.

Note that for Cesium, Rubidium, and Lithium, the m $^2D_{5/2}$ level lies higher in energy than its pair companion m $^2D_{3/2}$ level, whereas for Potassium and Sodium the $^2D_{3/2}$ levels lie above the $^2D_{5/2}$ levels.

The $^2P_{3/2}$ and $^2D_3$ level electron populations driven by the first, second, and third drive pump lasers are relaxed by collisions with buffer gas atoms or molecules to their respective, paired lower-lying $^2P_{1/2}$ and $^2D_3$ levels. Let the respective energy splittings of these level pairs be $\Delta E_1$, $\Delta E_2$, and $\Delta E_3$). If these collisional relaxation rates are sufficiently fast (generally proportional to the buffer gas number density), and the three drive pump laser intensities are sufficiently high (see below), then the electron population density of the $^2P_{1/2}$ level paired with the terminal level of the third excitation step is inverted with respect to the electron population density in the n $^2S_{1/2}$ ground level. Laser action on the corresponding UV transition terminating on the ground level, with a wavelength $\lambda_{laser}$, is enabled when the optical cavity losses at this UV wavelength are rendered sufficiently small.

Figure 8:
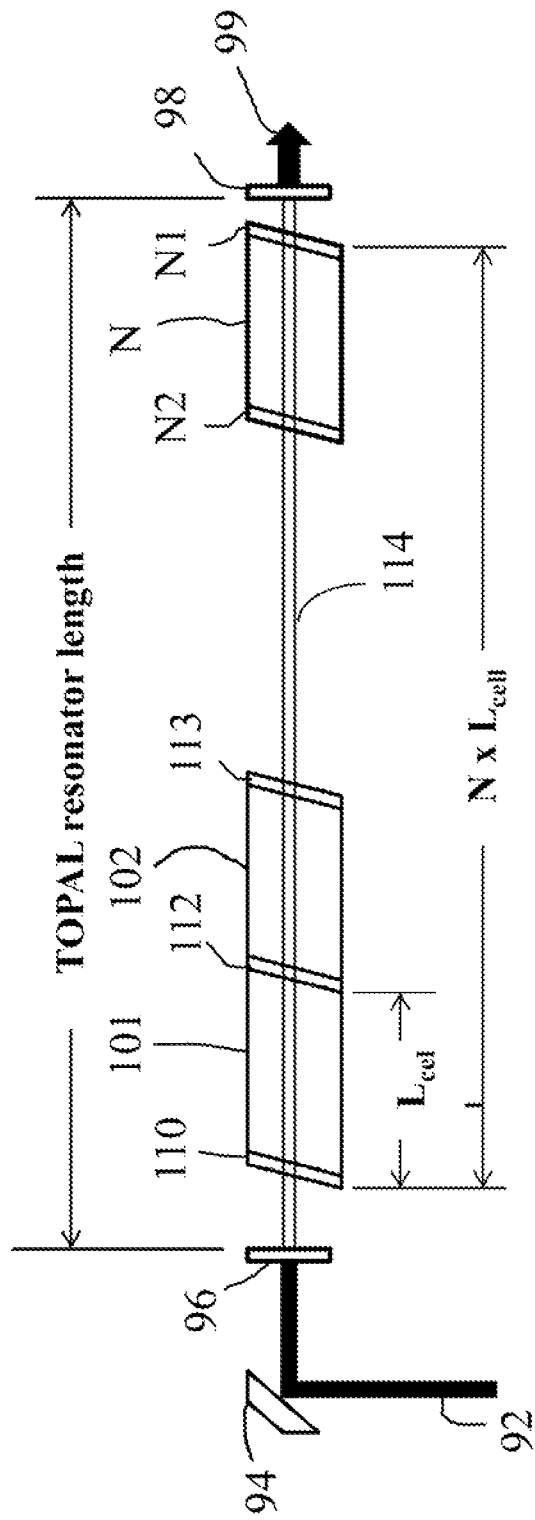
FIG. 8 shows a segmented TOPAL gain cell.

Again, in addition to the aforementioned desired population inversion densities established to permit DUV laser emission, population inversions densities will also be created between $^2P_{3/2}$ and $^2P_{1/2}$ levels excited by the third drive pump laser and lower-lying electronic levels of opposite parity that are not directly excited by first and second pumps, and therefore nominally unpopulated. For efficient DUV laser extraction of atom excitation energy, it is necessary to substantially limit the degree of amplified spontaneous emission (ASE) on these parity-allowed electric dipole transitions. Generally, it is the longest wavelength of these "ASE" transitions that are most deleterious to efficient DUV laser emission because the magnitude of the emission cross-section scales as the square of the transition wavelength. ASE on such transitions will have no significant deleterious effect on the efficiency of DUV energy extraction if the degree of ASE growth is limited to approximately $\leq 10$ nepers above the spontaneous emission intensity. This need to so limit ASE growth is addressed in the present invention by segmenting the gain cell, as shown schematically in FIG. 8, which shows the drive pump beams 92 reflected by mirror 94 into the resonator comprising reflectors 96 and 98. The cell is shown with 3 of N sub-cells or segments 101, 102 to cell N. The figure shows the first cell and the last cell as having windows 110 and N1, respectively and the sub-cells each have a window between them (see windows 112, 113 to N2). Notice that the windows are set at an oblique angle with respect to the resonating DUV laser beam 114, which resonates on the optical axis of the resonator formed by reflectors 96 and 98. Output beam 99 comprises a UV wavelength. Thus, FIG. 8 shows a segmented cell where the total path length of atomic vapor is split into several shorter lengths, and where each segment is realized with a separate cell. The windows of the cells are made from an optical material that transmits at the wavelengths of the pumps and UV output beams, but absorbs at the wavelengths of any threatening ASE radiation from the atomic vapor. One such example is a sodium TOPAL where sapphire or certain selected glass windows can be used to absorb and suppress strong ~9.1 micron ASE from the atomic vapor.

Figure 9:
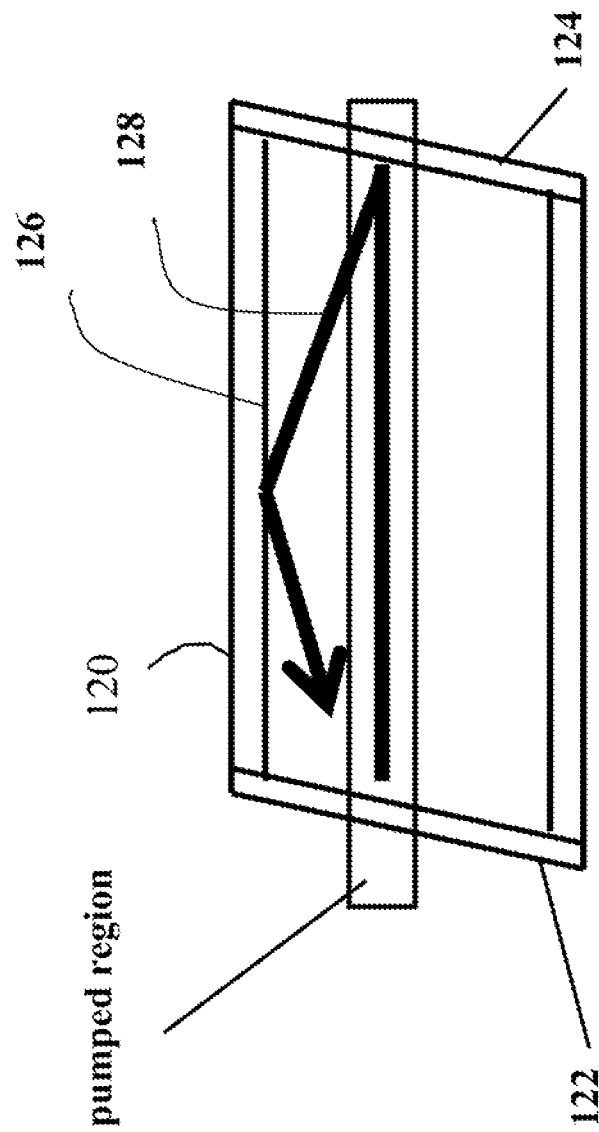
FIG. 9 shows TOPAL gain cell segment detail with an axial ASE ray path.

A single segment of a cell 120 is shown in FIG. 9. The cell includes ASE filters 122 and 124 periodically along the axis of the optical resonator. The ASE filter are selected so that they absorb preferentially at the wavelength of the wavelength(s) of the threatening ASE transition(s), while manifesting low loss at the wavelengths of the first, second, and third drive pump wavelengths, and at the wavelength of the output DUV laser wavelength. The walls 126 of the cell in this embodiment are textured to provide a scattering surface for the ASE ray 128. Thus, FIG. 9 shows an alternate method of controlling ASE with a segmented cell, where each segment has canted windows that deflect any axially directed ASE rays largely out of the optically pumped volume. The canted windows redirect the ASE, so that it is either harmlessly absorbed in the walls of the cell, or leaves the cell altogether.

FIGS. 10-14 list spectroscopic parameters for Cesium, Rubidium, Potassium, Sodium, and Lithium TOPALs, respectively, including 1) drive pump laser wavelengths; 2) output UV wavelengths; and 3) associated transition initial and terminal quantum numbers.

When, in an alkali TOPAL, the three external drive pump laser intensities are sufficiently large, and the collisional mixing rates are sufficiently large to bring pairs of $^2P_J$ and $^2D_J$ levels significantly toward a Boltzmann equilibrium, and threatening ASE transitions are limited to less than ≤10 nepers of gain in a segmented gain sub-cell by selective spectral filtering, a maximum population inversion density, $\Delta n_{max}$, is produced between the high-lying, third-step excited $^2P_{1/2}$ level and the $^2S_{1/2}$ ground level (assuming no stimulated emission due to this population inversion). Let the total alkali atom density be $N_0$. This maximum population inversion density, normalized to the total alkali atom density, $\Delta n_{max}/N_0$, depends only on the temperature, T, and the appropriate energy splittings of the $^2P_3$ levels (for an alkali TOPAL pumped via a $^2S_{1/2}$ level), or of the $^2P_J$ and $^2D_J$ levels (for an alkali TOPAL pumped via a $^2D_{3/2}$ level).

For an alkali TOPAL pumped via a $^2S_{1/2}$ level, the maximum normalized population inversion density is given by:

$$\Delta n_{max}/N_0 = \{I/\gamma_1 - I/\gamma_2\} \times \{4 + 3\gamma_2 + I/\gamma_2\}^{-1} \quad (1)$$

$$\text{where } \gamma_1 = 1.44 \, \Delta E_1/T \quad (2)$$

$$\text{and } \gamma_2 = 1.44 \, \Delta E_2/T \quad (3)$$

where $\Delta E_1$ is the energy splitting of the (n+1) $^2P_J$ level pair, and $\Delta E_2$ is the energy splitting of the $^2P_J$ level pair excited in the third step excitation. (The $\Delta E$ and T units in (2) and (3) are, respectively, cm$^{-1}$ and °K.)

Figure 15:
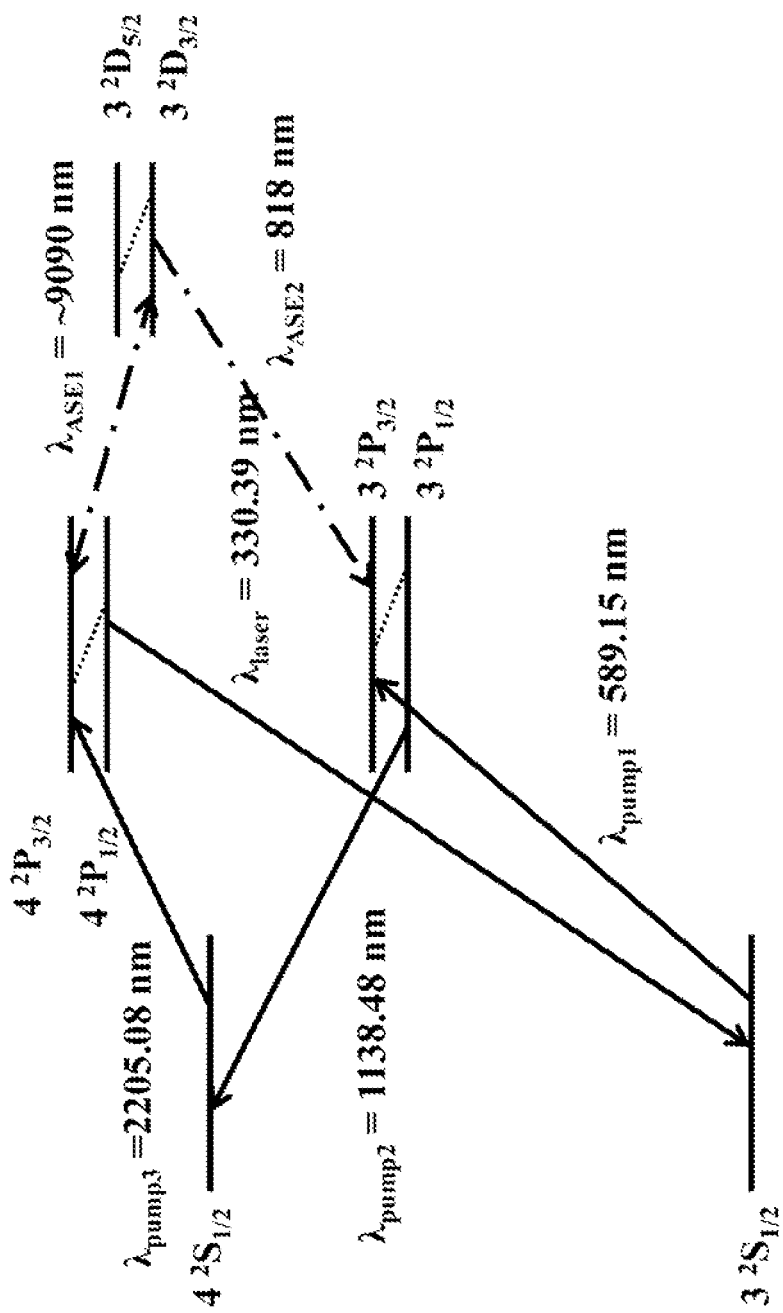
FIG. 15 shows an energy level scheme of a 330 nm Sodium TOPAL pumped by to $^2S_{1/2}$ level.
Figure 16:
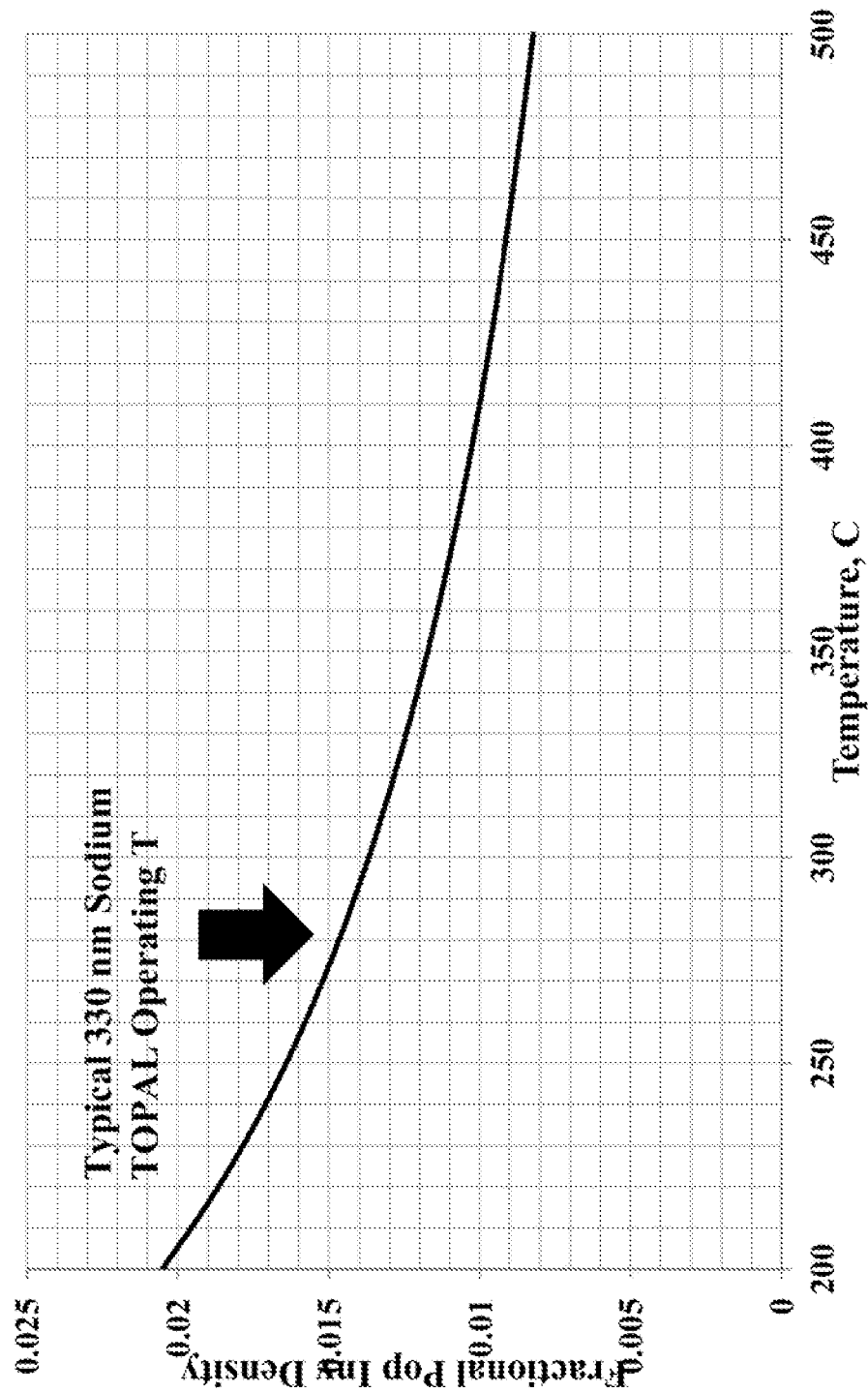
FIG. 16 shows normalized maximum fractional population inversion density of a 330 nm, $^2S_{1/2}$ level pumped, Sodium TOPAL.

As an example and a TOPAL preferred embodiment, consider the characteristics and projected performance of a Sodium (Na) $^2S_{1/2}$ TOPAL type operating at 330 nm in the $4\,^2P_{1/2} \rightarrow 3\,S_{1/2}$ transition (the energy level scheme is shown in FIG. 15). For this TOPAL, $\Delta E_1 = 17.192$ cm$^{-1}$ and $\Delta E_2 = 1.25$ cm$^{-1}$, and the normalized maximum population inversion density as a function of temperature is shown in FIG. 16. At a nominal operating temperature of ~280 C, the normalized maximum population inversion density is ~0.01 of the Na atom density, sufficient as shown below to enable a quite efficient CW 330 nm TOPAL.

The normalized maximum population inversion densities for $^2D_{3/2}$ TOPAL types on be calculated by expressions similar to Eq. (1).

Figure 7:
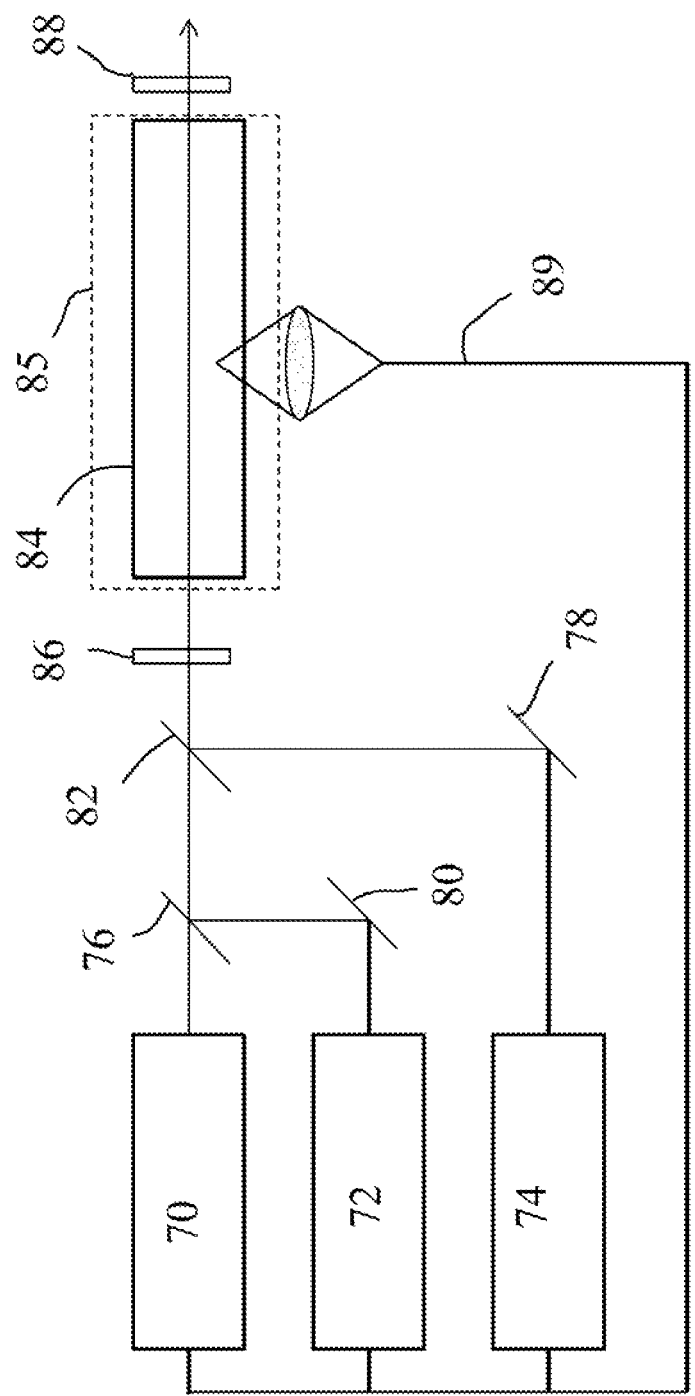
FIG. 7 shows an example of a TOPAL device geometry.

To project alkali TOPAL performance of a 330 nm Sodium $^2S_{1/2}$ type TOPAL type laser, and to illustrate a preferred technique for limiting the degree of ASE of threatening transitions in the TOPAL, a rate-equation model was constructed for this TOPAL, assuming the end-pumping geometry shown schematically in FIG. 7.

Figure 18:
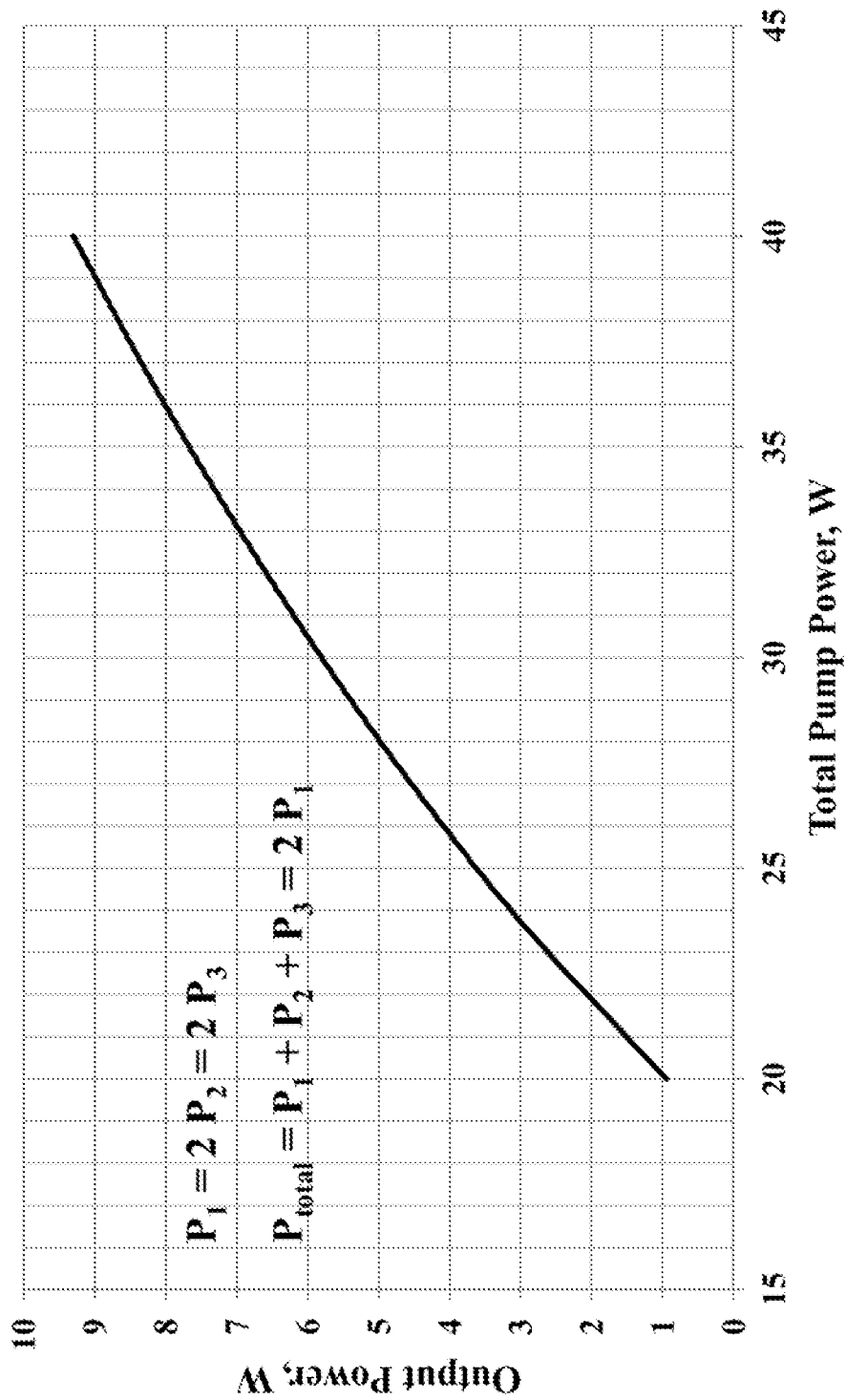
FIG. 18 shows output power of a $^2S_{1/2}$ type 330 nm Sodium TOPAL vs. total drive laser pump power (assuming $P_{Total}=2 P_1$; $P_1=2 P_2=2 P_3$).
Figure 19:
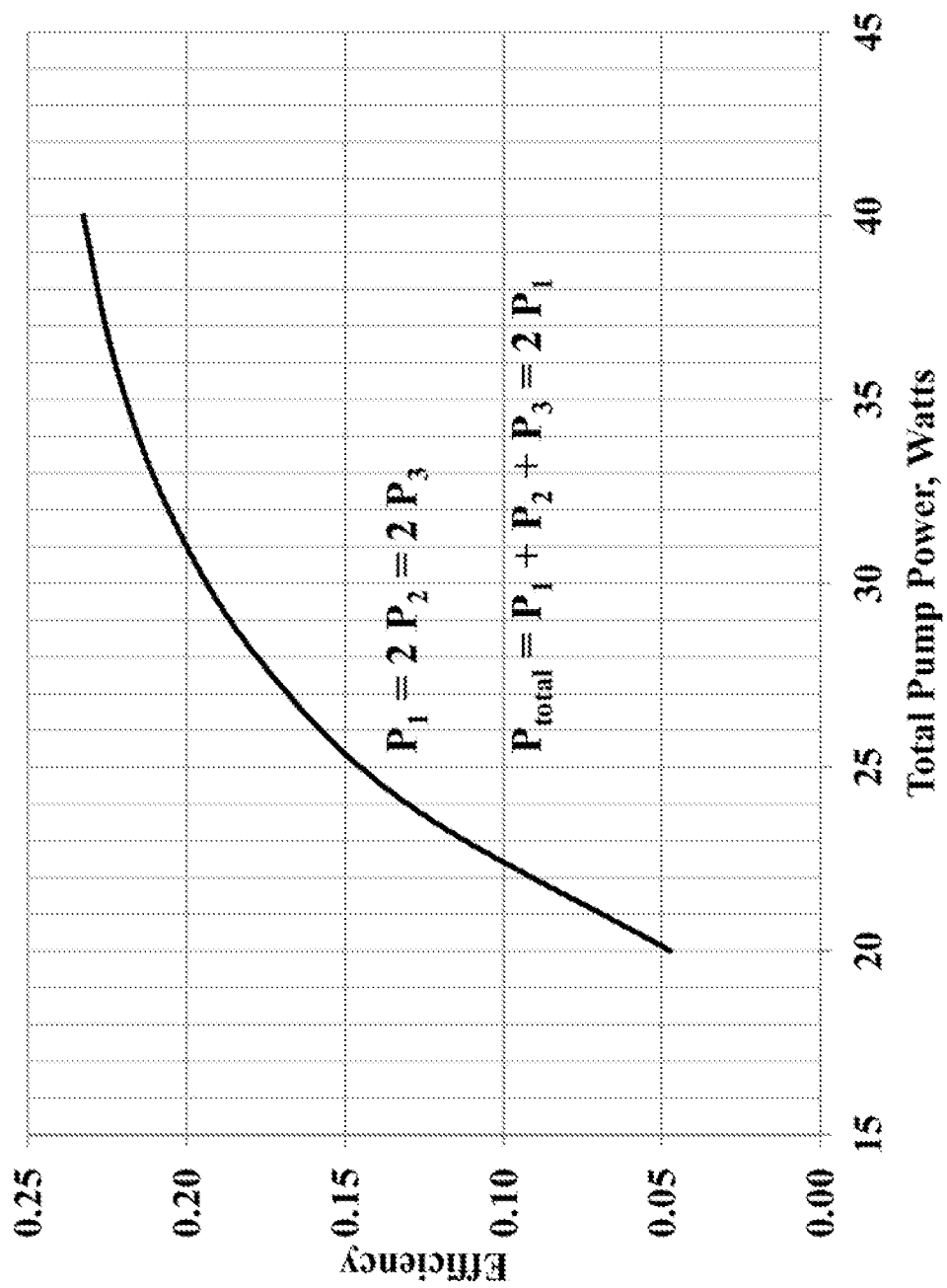
FIG. 19 shows optical-to-optical power efficiency of a $^2S_{1/2}$ type 330 nm Sodium TOPAL vs. total drive pump laser power (assuming $P_{Total}=2 P_1$; $P_1=2 P_2=2 P_3$).

This alkali TOPAL code treats the electron populations of up to 14 active levels, the photon fluxes of the three external drive pump lasers, as well as the photon flux of the output deep UV laser, and optionally photon fluxes of ASE from the vapor. The code assumes ID geometry and plane waves for all of the laser fluxes. It links electron populations and fluxes through a set of rate equations, including pooling processes. Collision broadened transition cross-sections are calculated using calculated transition moments and measured collisional broadening parameters. For this Na TOPAL, the 3 $^2P_J$ collisional mixing cross-section for helium buffer gas was taken from the literature, and the mixing rate in the code was set by the assumed He buffer pressure. The code was used to project the performance of a 330 nm Sodium TOPAL. In these calculations assumed device parameters are listed in FIG. 17. FIG. 18 shows the projected output power at 330 nm as a function of the total drive pump power. FIG. 19 shows the projected optical-to-optical conversion efficiency (ratio of 330 nm laser output power to total drive pump power) as a function of the total drive pump power.

Together, FIGS. 18 and 19 show that the 330 nm Sodium TOPAL has extremely attractive operating performance potential, achieving ~10 watt pure CW power with optical-to-optical efficiencies greater than 20%. Using pump sources that are typically 25% efficient, the overall wall plug efficiency of this TOPAL will typically be greater than 5%. This projected performance exceeds current commercially available devices by a high factor in both power and efficiency, without the use of NLO crystals undergoing irradiation at 330 nm. For this point design of a Sodium TOPAL, the total pump intensity is a ~32 kW/cm² (at visible and infrared wavelengths), and the output laser intensity at 330 nm is 8 kW/cm². Since the laser resonator out-coupled power fraction is 3% in this design, the circulating intensity at 330 nm is 265 kW/cm². Of course, here there is no NLO crystal subjected to this flux at this wavelength. It should be noted that this point design has not been optimized in terms of the myriad design parameters: temperature, cavity length, ratios of various pump intensities with respect to each other, out-coupling fraction, etc. Improved performance compared to that of the point design presented above can reasonably be anticipated.

Additionally, given the higher normalized maximum population inversion densities for Cesium, Rubidium, and Potassium (compared to Sodium) it is anticipated that TOPALs utilizing the former alkali atoms will manifest even higher performance levels.

The simulation of the 330 nm Sodium TOPAL, point design indicates that dominant threatening ASE transition is the $4p\,^2P_{3/2} \rightarrow 3d\,^2D_{5/2}$ transition with a wavelength near ~9.1 microns (see FIG. 15). At the maximum total pump power of 40 watts, the axial ASE gain of this transition is 26 nepers (with no segmented filtering). To limit the single-pass axial ASE gain to, say, 10 nepers, the TOPAL gain cell should be segmented into 3 sub-cells, each with a length of ~3 cm (see FIGS. 8 and 9).

An example of a suitable filter to suppress and control axial ASE is a thin plate of silica glass. FIG. 20 shows a plot of the absorption index, k, vs wavelength, for plate of silica glass [Kitamura, Applied Optics, 46 (33), 8118 (2007)], where the complex index of refraction is defined as n+iκ. The relation between the absorption coefficient at wavelength $\lambda$, $\alpha(\lambda)$, and the absorption index, $\kappa(\lambda)$, is:

$$\alpha(\lambda) = 4\pi\kappa(\lambda)/\lambda \quad (4)$$

FIG. 20 shows that this material is essentially transparent from 300 nm to several microns, and possess a sharp peak located near ~9.1 microns. Thus, for this silica glass material, with k~3 at 9.1 microns, the absorption coefficient at ~9.1 microns is ~1.5×10$^5$ cm$^{-1}$. Thus, a silica glass plate thickness of less than a mm, place at Brewster's angle (at the 330 nm laser wavelength for low insertion loss at this wavelength), will present ~10,000 nepers of loss at the wavelength of the 9.14 micron ASE transition. In the next gain cell segment, the axial ASE emission will begin again at the low spontaneous rate, grow by 10 nepers, and then encounter another Brewster plate filter. And so on. Thus, the ~9.1 micron ASE transition will never grow in intensity sufficiently to divert significant population and output power from the desired 330 nm laser beam.

Next, we turn to the use of Thallium, Indium, or Gallium atomic vapor as the gain specie in a different type of TOPAL. These neutral atoms, like alkali atoms, possess but a single valance electron. However, in these atoms the ground state is a $^2P_{1/2}$ level rather than $^2S_{1/2}$. Nonetheless the principles of TOPALs elucidated herein can be readily applied to atoms with this ground state. We now illustrate the principles of TOPALs for a specie with a $^2P_{1/2}$ ground state by considering in detail a 258 nm TOPAL using atomic Thallium as the active gain specie.

FIG. 21 lists spectroscopic parameters for Thallium, Indium, and Gallium TOPALs, respectively, including 1) drive pump wavelengths; 2) output laser wavelengths; and 3) associated transition initial and terminal quantum numbers.

Figure 22:
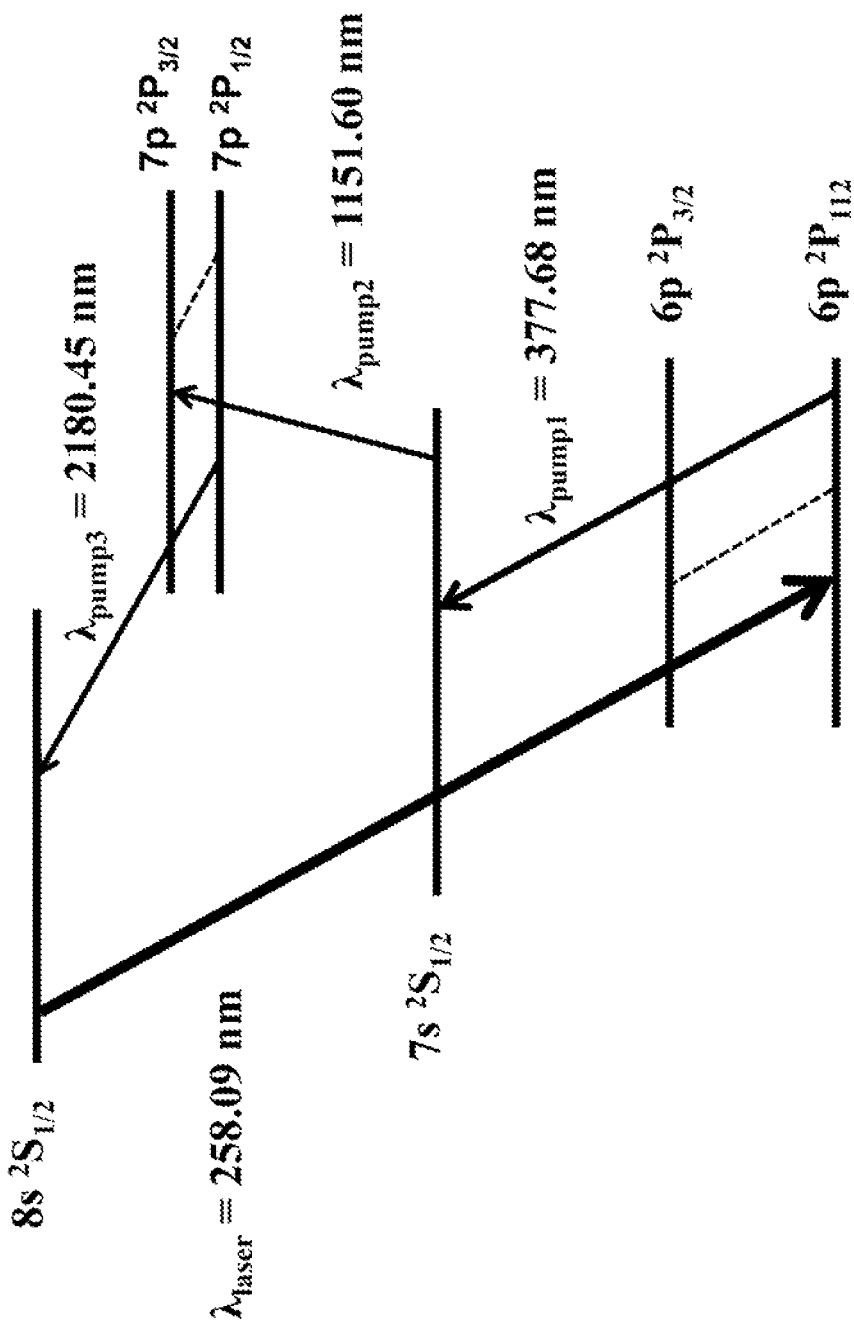
FIG. 22 shows an energy level scheme of a 258 nm Thallium TOPAL.

FIG. 22 shows all of the electronic levels of the Tl atom lying below ~39,000 cm$^{-1}$. In this TOPAL scheme, the first pump, with power $P_1$ and wavelength is resonant with the parity-allowed electric-dipole 6p $^2P_{1/2} \to$ 7s $^2S_{1/2}$ transition at a wavelength of 377.68 nm, the second pump, with power $P_2$ and wavelength $\lambda_{pump2}$ is resonant with the parity-allowed electric-dipole 7s $^2S_{1/2} \to$ 7p $^2P_{3/2}$ transition at a wavelength of 1151.60 nm, and the third pump, with power $P_3$ and wavelength $\lambda_{pump3}$ is resonant with the parity-allowed electric-dipole 7p $^2P_{1/2} \to$ 8s $^2S_{1/2}$ transition at a wavelength of 2180.45 nm. The output power, $P_{out}$, at a wavelength $\lambda_{laser}$, of 258.09 nm occurs in the 8s $^2S_{1/2} \to$ 6p $^2P_{1/2}$ transition.

The one preferred embodiment the small hydro-carbon molecule methane, ($CH_4$), is used as a buffer gas to collisionally relax the pumped 7p $^2P_{3/2}$ electronic level to the 7p $^2P_{1/2}$ electronic level, enabling a CW population inversion density between the 8s $^2S_{1/2}$ upper laser level and the 6p $^2P_{1/2}$ ground electronic level. In a second preferred embodiment the small molecule ammonia ($NH_3$) is used as a buffer gas.

In this TOPAL scheme, the parity-allowed, electric-dipole 8s $^2S_{1/2} \to$ 6p $^2P_{3,2}$ transition at a wavelength of 323.07 nm would superficially appear to be a deleterious ASE transition since the population in the 6p $^2P_{3,2}$ level is zero as pumping begins. Fluorescence and ASE from the 8s $^2S_{1/2}$ level will populate this level and eventually ASE will self terminate as the population inversion density approaches zero.

To model the performance of a Thallium TOPAL we utilized the rate equation code described previously, but adapted with spectroscopic and kinetic data appropriate to the Thallium atom (the code was also rendered for projecting the performance of a 256 nm Indium TOPAL). The performance of a 258 nm Thallium TOPAL device was projected using the device parameters listed in FIG. 23.

Figure 24:
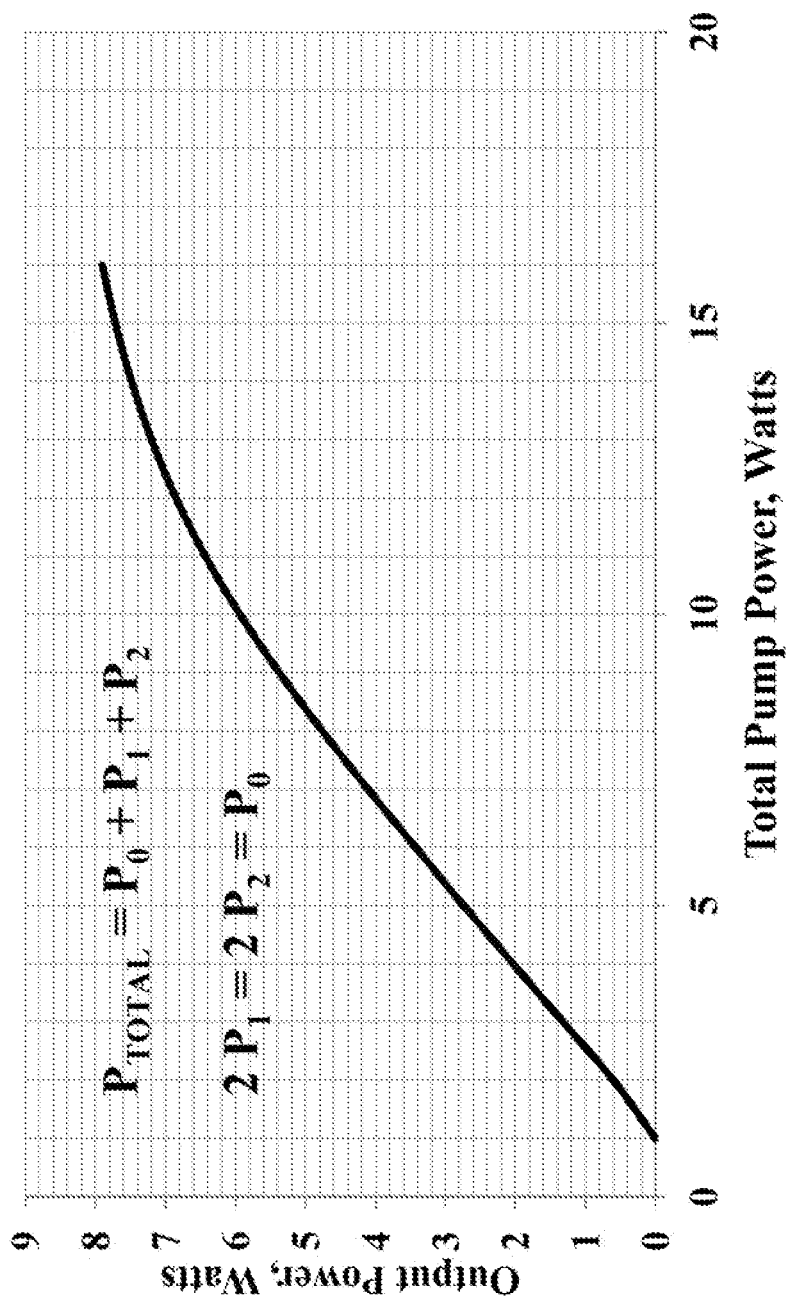
FIG. 24 shows the output power of a 258 nm Thallium TOPAL vs total drive laser pump power (assuming $P_{Total}=2 P_1$; $P_1=2 P_2=2 P_3$).

FIG. 24 shows the projected output power of a 258 nm Thallium TOPAL as a function of the total pump power. Here the ratios of pump powers were held constant, as follows: $P_2=P_1/2$; $P_3=P_1/2$; $P_{total}=P_1+P_2+P_3=2 P_1$. FIG. 24 shows that a multi-watt level of output power at the wavelength of 258 nm can be anticipated.

Simulation of the Thallium TOPAL shows that all emission transitions (save the desired 258 nm output laser transition) experience net loss in propagation through the full 3 cm long cell, and therefore no segmentation of the gain cell is required to maintain power flow from the pump lasers to the 258 nm output laser beam.

Figure 25:
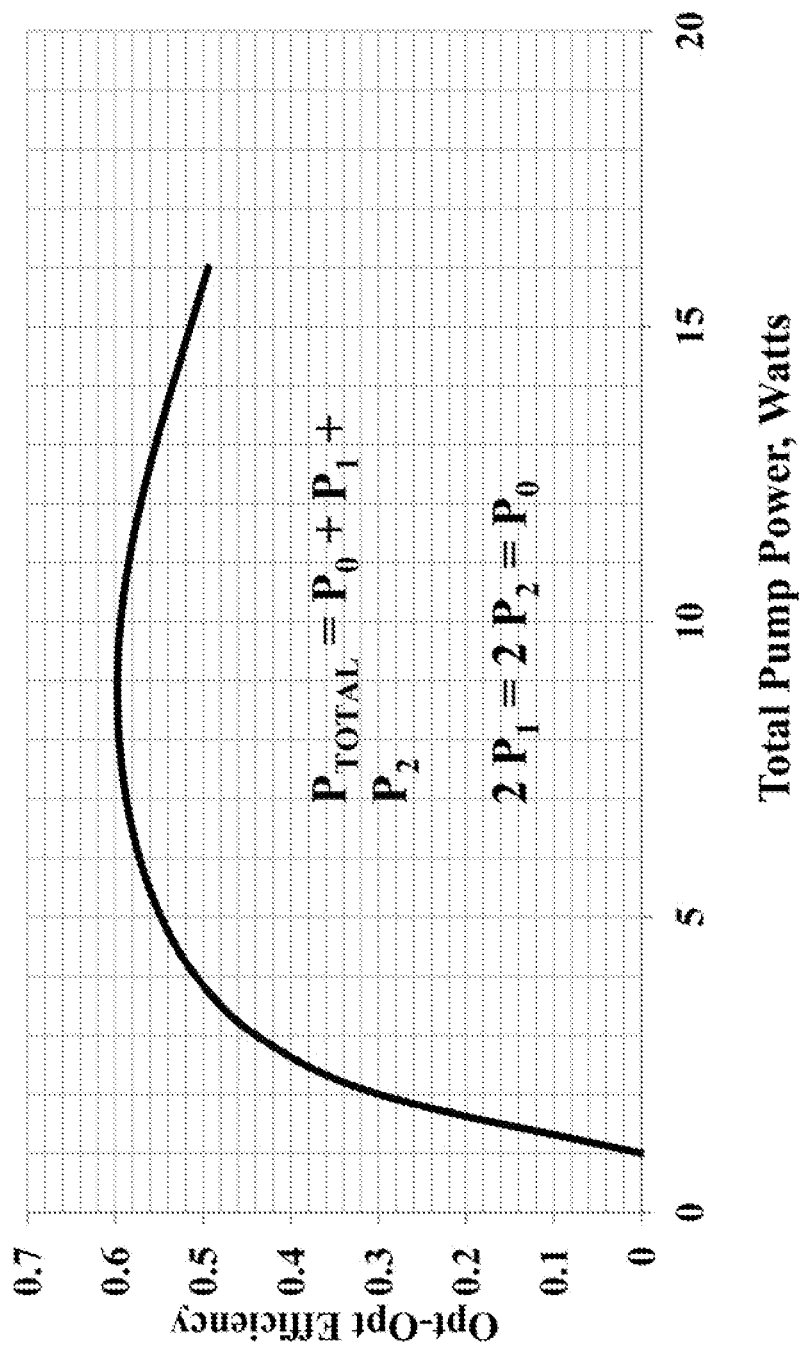
FIG. 25 shows the optical-to-optical power efficiency of a 258 nm Thallium TOPAL vs Pump Power (assuming $P_{Total}=2 P_1$; $P_1=2 P_2=2 P_3$).

FIG. 25 shows the projected optical-to-optical power efficiency of a 258 nm Thallium TOPAL as a function of the total pump power. Again, the ratios of pump powers were held constant, as follows: $P_2=P_1/2$; $P_3=P_1/2$; $P_{total}=P_1+P_2+P_3=2 P_1$. FIG. 25 shows that optical-to-optical efficiencies as high a ~60% are anticipated. Assuming pump laser efficiencies at ~20%, the wall plug efficiency of this Thallium TOPAL can be expected to be ~10%.

In this point design of a Thallium TOPAL the total pump intensity is 16 kW/cm$^2$ at visible and infrared wavelengths. The output laser intensity at 258 nm is 6.5 kW/cm$^2$. Since the laser resonator out-coupled power fraction is 2.5% in this design, the circulating intensity at 258 nm is 260 kW/cm$^2$. Of course, there is no NLO crystal subjected to this flux at this wavelength. It should be noted that this point design has not been optimized in terms of the myriad design parameters: temperature, cavity length, ratios of various pump intensities with respect to each other, out-coupling fraction, etc. Improved performance compared to that of the point design presented above can reasonably be anticipated.

As noted earlier, the requirement for resonant pumping is critical to the operation of TOPALs. For TOPAL's to operate most effectively, each drive pump laser wavelength should be such as to maximize the laser-induced transition rate of the atomic specie between the two levels connected by the drive pump laser. Thus the drive pump wavelength is set ideally at the spectral peak of transition to which it couples, under the conditions of temperature, buffer gas(es) and pressure pertaining to the gain medium. For practical purposes, herein a drive pump is considered resonant with, matched to, or substantially equal to the wavelength of a transition when the drive pump wavelength lies within about the spectral half-width of the spectral peak wavelength ($\lambda_{LC}$) of the transition. Both the pump wavelength and the pump bandwidth is ideally constrained by this condition.

Practitioners of the art of lasers will readily appreciate that the spectral linewidth of a transition has both a Doppler component and a collisional component, which scale differently with the wavelength of the transitions. However, under the conditions of the 258 nm Thallium TOPAL laser described herein, a typical spectral frequency linewidth of the three pumped transitions is approximately 1-3 GHz. Under the conditions of the (higher pressure) 330 nm Sodium TOPAL laser described herein, a typical spectral linewidth for the three pumped transitions is approximately 5-20 GHz, and somewhat greater for IR transitions emitting ASE. The wavelength and bandwidth of a drive pump are therefore lie ideally in the range $\lambda_{LC}-\delta\lambda<\lambda<\lambda_{LC}+\delta\lambda$ where $\lambda_{LC}$ is the actual spectral peak wavelength. Typically, in the visible spectral region, $\delta\lambda/\lambda_{LC}\sim10^{-4}$ for the drive pumps of the 258 nm Thallium TOPAL laser and $10^{-3}$ for the 330 nm Sodium TOPAL laser. Given the collisional literature data and operating conditions of a TOPAL, it is straightforward to estimate the Voigt integrals and the wavelength and bandwidth tolerances for each pump laser in the TOPAL.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A triply-optically-pumped atomic laser (TOPAL), comprising:
   an optical cavity that has a resonance at a predetermined wavelength within a range from ~230 nm to ~370 nm;
   a gain medium within said optical cavity, said gain medium comprising a mixture of at least one buffer gas and an atomic vapor;
   wherein said gain medium has at least one ultraviolet (UV), parity allowed, electric dipole transition in said range that terminates on the ground level of said atomic vapor, wherein said predetermined wavelength is resonant with said UV, parity allowed, electric dipole transition, wherein said buffer gas collisionally rapidly transfers pump-excited electron population between excited n $^2P_1$ or n $^2D_1$ spin-orbit pair levels of atoms of said atomic vapor;
   an oven configured to maintain said gain medium at a predetermined temperature;
   a continuous wave (CW) first pump laser configured for emitting a first pump beam having a wavelength $\lambda_{pump1}$, that is fully resonant with a first parity allowed, electric dipole transition whose initial energy level is the n $^2S_{1/2}$ ground level and whose terminal energy level is the energetically lowest lying n $^2P_{3/2}$ level when the said atomic vapor is an alkali vapor, or whose initial energy level is the $^2P_{1/2}$ ground level and whose terminal level is the energetically lowest lying $^2S_{1/2}$ level when said atomic vapor is a Thallium, or indium, or Gallium atomic vapor;
   a CW second pump laser configured for emitting a second pump beam having a wavelength $\lambda_{pump2}$, that is fully resonant with a second parity allowed, electric dipole transition whose initial level is said energetically lowest lying n $^2P_{1/2}$ level and whose terminal level is either the energetically second lowest lying n+1 $^2S_{1/2}$ level, or the energetically lowest lying m $^2D_{3/2}$ level when said atomic vapor is an alkali vapor, or whose initial level is the said energetically lowest lying $^2S_{1/2}$ level and whose terminal level is the energetically second lowest lying $^2P_{3/2}$ level when said atomic vapor is a Thallium, or Indium, or Gallium atomic vapor;
   a CW third pump laser configured for emitting a third pump beam having a wavelength $\lambda_{pump3}$, that is fully resonant with a third parity allowed, electric dipole transition whose initial level is said energetically second lowest lying n+1 $^2S_{1/2}$ level and whose terminal level is the n+2 or energetically higher lying $^2P_{3/2}$ level when said atomic vapor is an alkali vapor, or whose initial level is the said m $^2D_{3/2}$ level and whose terminal level is the n+2 or energetically higher lying $^2P_{3/2}$ level when said atomic vapor is an alkali atomic vapor, or whose initial level is the energetically second lowest lying $^2P_{1/2}$ level and whose terminal level is the energetically second lowest or higher lying $^2S_{1/2}$ level when said atomic vapor is a Thallium, or Indium, or Gallium atomic vapor; and
   means for directing said first pump beam, said second pump beam and said third pump beam into said gain medium.

2. The TOPAL of claim 1, wherein said means for directing includes means for simultaneously and coaxially directing said first pump beam, said second pump beam and said third pump beam into said gain medium.

3. The TOPAL of claim 1, further comprising a cell for containing said gain medium, wherein said gain medium is located in said cell, wherein said cell comprises a window at each of its ends.

4. The TOPAL of claim 3, wherein said cell comprises a plurality of cells each containing a portion of said gain medium.

5. The TOPAL of claim 4, wherein each said window is absorptive at one or more wavelengths emitted by the atomic vapor, other than said wavelengths $\lambda_{pump1}$, $\lambda_{pump2}$, $\lambda_{pump3}$ and an output wavelength of $\lambda_{laser}$ said TOPAL.

6. The TOPAL of claim 4, wherein at least one said window is set obliquely to the optical axis of said optical cavity.

7. The TOPAL of claim 1, wherein said atomic vapor comprises thallium atomic vapor.

8. The TOPAL of claim 7, wherein said buffer gas is selected from the group consisting of methane, ammonia, carbon tetrafluoride, nitrogen tritluoride and a mixture of methane and helium.

9. The TOPAL of claim 7, wherein said wavelength $\lambda_{pump1}$ is within 0.01 nm of the spectral peak of the thallium transition at 377,679 nm, wherein said wavelength $\lambda_{pump2}$ is within 0.03 nm of the spectral peak of the thallium transition at 1151.596 nm, wherein said wavelength $\lambda_{pump3}$ is within 0.05nm of the spectral peak of the thallium transition at 2180.549 nm and wherein TOPAL produces an output wavelength $\lambda_{laser}$ that is within 0.02 nm of the spectral peak of the thallium transition at 258.092 nm.

10. The TOPAL of claim 7, wherein said buffer gas is in a cell and comprises a pressure within said cell of greater than 0.01 atmospheres and less than 1.0 atmospheres.

11. The TOPAL of claim 1, wherein said atomic vapor comprises sodium atomic vapor.

12. The TOPAL of claim 11, wherein said buffer gas comprises helium.

13. The TOPAL of claim 12, wherein said buffer gas is in a cell and comprises a pressure within said cell of between 0.3 atmosphere and 3 atmospheres.

14. The TOPAL of claim 13, wherein at least one said windows comprises sapphire crystal.

15. The TOPAL of claim 11, wherein said wavelength $\lambda_{pump1}$ is within 0.03 nm of the spectral peak of the sodium transition at 589.15 nm, wherein said wavelength $\lambda_{pump2}$ is within 0.06 nm of the spectral peak of the sodium transition at 1138.48 nm, wherein said wavelength $\lambda_{pump3}$ is within 0.1 nm of the spectral peak of the sodium transition at 2205.08 nm and wherein said TOPAL produces an output wavelength $\lambda_{laser}$ that is within 0.05 nm of the spectral peak of the sodium transition at 330.39 nm.

16. The TOPAL of claim 1, wherein said atomic vapor is selected from alkali atoms, thallium atoms, indium atoms and gallium atoms.

17. A method for operating a triply-optically-pumped atomic laser (TOPAL), comprising:

providing the apparatus of claim 1;

maintaining said gain medium at a predetermined temperature that provides a density of the atomic specie of at least $10^{12}$ atoms per cc;

providing, from said continuous wave (CW) first pump laser, a first pump beam having a wavelength $\lambda_{pump1}$, that is resonant with a first parity allowed, electric dipole transition of said atomic vapor;

providing, from said CW second pump laser, a second pump beam having a wavelength $\lambda_{pump2}$, that is resonant with a second parity allowed, electric dipole transition of said atomic vapor;

providing, from said CW third pump laser, a third pump laser configured for emitting a third pump beam having a wavelength $\lambda_{pump3}$, that is resonant with a third parity allowed, electric dipole transition of said atomic vapor; and directing said first pump beam, said second pump beam and said third pump beam into said gain medium.

18. The method of claim 17, wherein the step of directing includes simultaneously and coaxially directing said first pump beam, said second pump beam and said third pump beam into said gain medium.

19. The method of claim 17, further comprising a cell for containing said gain medium, wherein said gain medium is located in said cell, wherein said cell comprises a window at each of its ends.

20. The method of claim 19, wherein said cell comprises a plurality of cells each containing a portion of said gain medium.

21. The method of claim 20, wherein each said window is absorptive at one or more wavelengths emitted by the atomic vapor, other than said wavelengths $\lambda_{pump1}$, $\lambda_{pump2}$, $\lambda_{pump3}$ and an output wavelength $\lambda_{laser}$ of said TOPAL.

22. The method of claim 20, wherein at least one said window is set obliquely to the optical axis of said optical cavity.

23. The method of claim 17, wherein said atomic vapor comprises thallium atomic vapor.

24. The method of claim 23, wherein said buffer gas is selected from the group consisting of methane, ammonia, carbon tetrafluoride, nitrogen trifluoride and a mixture of methane and helium.

25. The method of claim 23, wherein said wavelength $\lambda_{pump1}$ is within 0.01 nm of the spectral peak of the thallium transition at 377.679nm, wherein said wavelength $\lambda_{pump2}$ is within 0.03 nm of the spectral peak of the thallium transition at 1151.596 nm, wherein said wavelength $\lambda_{pump3}$ is within 0.05nm of the spectral peak of the thallium transition at 2180.549 nm and wherein TOPAL produces an output wavelength $\lambda_{laser}$ that is within 0.02 nm of the spectral peak of the thallium transition at 258.092 nm.

26. The method of claim 23, wherein said buffer gas is in a cell and comprises a pressure within said cell of greater than 0.01 atmospheres and less than 1.0 atmospheres.

27. The method of claim 17, wherein said atomic vapor comprises sodium atomic vapor.

28. The method of claim 27, wherein said buffer gas comprises helium.

29. The method of claim 28, wherein said buffer gas is in a cell and comprises a pressure within said cell of between 0.3 atmosphere and 3 atmospheres.

30. The method of claim 29, wherein at least one said windows comprises sapphire crystal.

31. The method of claim 27, wherein said wavelength $\lambda_{pump1}$ is within 0.03 nm of the spectral peak of the sodium transition at 589.15 nm, wherein said wavelength $\lambda_{pump2}$ is within 0.06 nm of the spectral peak of the sodium transition at 1138.48 nm, wherein said wavelength $\lambda_{pump3}$ is within 0.1 nm of the spectral peak of the sodium transition at 2205.08 nm and wherein said TOPAL produces an output wavelength $\lambda_{laser}$, that is within 0.05 nm of the spectral peak of the sodium transition at 330.39 nm.

32. The method of claim 17, wherein said atomic vapor is selected from alkali atoms, thallium atoms, indium atoms and gallium atoms.

* * * * *